(12) United States Patent
James, Jr. et al.

(10) Patent No.: US 8,666,038 B2
(45) Date of Patent: *Mar. 4, 2014

(54) METHOD, APPARATUS AND SYSTEM FOR PARK CALL MESSAGES

(75) Inventors: Robert J. James, Jr., Half Moon Bay, CA (US); Shen-Yuan Yap, Woodland Hills, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/528,093

(22) Filed: Jun. 20, 2012

(65) Prior Publication Data

US 2012/0275586 A1 Nov. 1, 2012

Related U.S. Application Data

(63) Continuation of application No. 11/870,268, filed on Oct. 10, 2007, now Pat. No. 8,229,084.

(51) Int. Cl.
*H04M 3/42* (2006.01)
*H04M 3/428* (2006.01)

(52) U.S. Cl.
USPC .............. 379/88.12; 379/201.01; 379/215.01; 455/412.2; 455/414.1

(58) Field of Classification Search
USPC .......... 379/88.12, 201.01, 215.01; 455/412.1, 455/412.2, 414.1, 417
See application file for complete search history.

(56) References Cited

U.S. PATENT DOCUMENTS 8,229,084 B2 * 7/2012 James et al. ............... 379/88.12
2004/0022381 A1 2/2004 Turner

OTHER PUBLICATIONS

European Patent Office, Examination Report dated Jul. 18, 2013, issued in European Patent Application No. 07839410.3.

* cited by examiner

*Primary Examiner* — Harry Hong
(74) *Attorney, Agent, or Firm* — Norton Rose Fulbright Canada LLP

(57) ABSTRACT

There is described a method and telecommunication server for maintaining communication between at least two devices. A first incoming call for a first communication device is received at the communication server. The first incoming call for the first communication device is routed to a second communication device associated with the first communication device. A park data signal is received from the second communication device for placing a call to park. The call is placed to park and a park reminder message is sent to the first communication device.

18 Claims, 24 Drawing Sheets

METHOD, APPARATUS AND SYSTEM FOR PARK CALL MESSAGES

CROSS-REFERENCE TO RELATED APPLICATIONS

The present application is a Continuation of U.S. patent application Ser. No. 11/870,268 filed Oct. 10, 2007, the entirety of which is hereby incorporated by reference.

BACKGROUND OF THE INVENTION

It has become relatively common for individuals to possess a number of different devices through which they communicate. For example, a person may have a home telephone, a wireless telephone, a pager, a personal digital assistant (PDA), and an office telephone to name a few. With the ubiquity of telephone calls routed through servers, new capabilities can be achieved. Examples of certain capabilities include forwarding calls from one device to another device, forwarding calls to voicemail exchanges, and even parking calls to allow the device owner additional time within which to connect the call before the call is forwarded to voicemail.

The disadvantages of the mobility of the population is that increasingly mobile users are generally multitasking with PDA's, email, and text messaging. Accordingly, it is increasingly frequent for mobile users to become distracted after having parked a call, and forget that a caller is holding indefinitely. The parked caller, which may be a customer or client of the mobile user, is left in a special state of hold indefinitely, and the caller's time is wasted. Frustrated with the amount of time the caller is left in park, the caller may choose to simply hang up. It is desirable, therefore, to decrease the frequency for mobile users to indefinitely place callers in park.

DETAILED DESCRIPTION OF THE INVENTION

Figure 1:
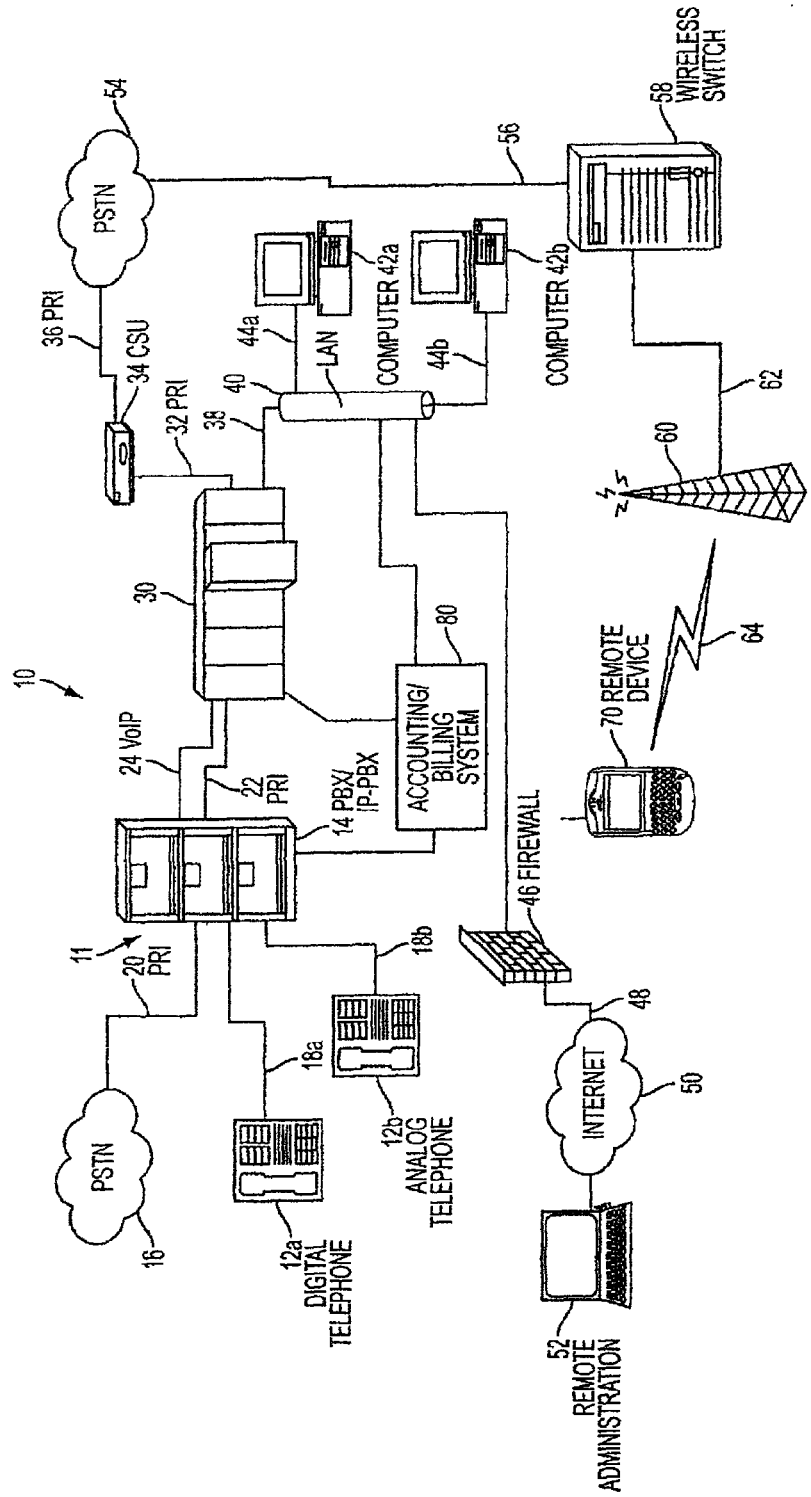
FIG. 1 illustrates an example of a telecommunication system constructed in accordance with an embodiment disclosed herein.

Example embodiments and applications will now be described. Other embodiments may be realized and structural or logical changes may be made to the disclosed embodiments. Although the embodiments disclosed herein have been particularly described as applied to a business or office environment, it should be readily apparent that the embodiments may be embodied for any use or application having the same or similar problems. Specific embodiments and applications related to the following description include, but are not limited to, a method of operating a communication device. The method includes sending a park data signal for placing a call to park. The method also includes receiving a park reminder message.

An additional embodiment and application includes a method of operating a communication server operable to maintain communication between at least two devices. The method includes the step of placing a call to park. The method also includes the step of sending a park reminder message.

As is described below, a telecommunication server is also provided. The telecommunication server includes a processor configured to place a telephone call to park. The processor is also configured to send a park message.

Another embodiment provides a telecommunication server comprising a processor configured to send a park data signal for placing a call to park and receive a park reminder message.

Another application and embodiment provides a telecommunication system. The telecommunication system includes a server and at least one remote device registered with the server. The server includes a processor configured to send a message to the at least one remote device indicating an incoming telephone call and receive a message from the at least one remote device accepting the incoming telephone call. The processor is also configured to park a previous telephone call and put the incoming telephone call in voice communication with the at least one remote device and send a park alert message to the at least one remote device after a predetermined length of time has lapsed after the incoming telephone call has been put in voice communication with the at least one remote device.

An additional embodiment and application includes a method of operating a telecommunication server and at least one remote device. The method includes the steps of detecting an incoming telephone call to the telecommunication server and sending a message from the telecommunication server to a first remote device. The method also includes detecting a park message from the first remote device and sending a message to a second remote device after a predetermined amount of time after the detection of the park message.

Embodiments disclosed herein relate to a telecommunication system that can selectively establish communications with one of a plurality of telephony devices after a caller has been placed in park. The system also has a processor configured to send a data signal, such as, for example, electronic mail (email), text messaging, or other forms of data communications to one or more remote devices without any user interaction. The data signal causes a processor and a remote device to execute a series of steps designed to route and control incoming and outgoing calls based on user preferences and perform PBX functions from the remote device.

A first example embodiment is discussed and illustrated with reference to its implementation within an office building, multiple office buildings or other enterprise establishment. In an office building, for example, personnel are assigned to offices (or cubicles) with each office having an associated telephone. The office devices such as telephones are typically connected to a PBX, exchange, or other call processing infrastructure. The PBX allows each office telephone to have its own telephone extension and a direct inward dial (DID) telephone number. A telephone extension is typically a three, four or five digit telephone number where station-to-station (i.e., office-to-office) calls can be placed by dialing the three, four or five digit extension. This is commonly referred to as direct extension dialing. A DID telephone number allows external calls (i.e., calls initiated outside of the office PBX) to be placed directly to the office telephone.

The embodiments disclosed are not to be limited to any particular environment or communications network. The embodiments may be implemented, for example, in a hotel, boarding house, dormitory, apartment, or other commercial or residential establishment, where individuals are assigned to a unique extension, DID telephone number or other identifier. Other embodiments can be based on other environments where a network is maintained. The term "office" as used herein encompasses a singular room or space within a business, other enterprise, hotel room or similar facility. The term "user" as used herein encompasses office personnel, hotel guests or other individuals associated with a telephone extension and DID telephone number.

The embodiments disclosed, moreover, are not to be limited to any particular type of communications. A person of skill in the art would understand that a communications network can accommodate one or more types of communications including telephony, multi media telephony, messaging based on data such as text, video clips, pictures, documents and others. Moreover, depending on the type of devices and communications used, it would be apparent to those skilled in the art that the users may be assigned to identifiers in addition to extensions and DID telephone numbers, such as URIs, including SIP URIs, email URIs, IM URIs, CPRI, GRUU.

FIG. 1 illustrates a telecommunication system 10 constructed in accordance with an embodiment disclosed herein. As will be discussed below, the system 10 provides for a full integration of remote telephony devices, such as a remote device 70 (shown in this example as a personal digital assistant (PDA) with wireless voice and data communications (also referred to herein as a mobile device)), into an office, enterprise or hotel PBX or other communications network. The remote device 70 may be any suitable wirelessly enabled handheld remote device. The remote device 70 may be a dual mode (simultaneous data and voice communication capabilities) or single mode communication device, personal digital assistant, etc. such as the device 800 described in further detail below in relation to FIG. 8. Such devices include Blackberry™ devices by Research In Motion Limited of Ontario, Canada, or Palm® Treo™ devices by Palm, Inc. of California, U.S.A. to name a few.

The system 10 can selectively establish communications with one of a plurality of devices, including one or more remote devices 70, associated with a particular telephone extension or DID telephone number. Moreover, the system 10 will allow remote devices 70 such as a mobile device (described below in more detail) to perform functions of a standard office telephone 12a, 12b for both inbound and outbound communications. That is, a remote device 70 will be able to use features of the office network (e.g., direct extension dialing, corporate dialing plan, enterprise voicemail etc.) even though the device is not within the confines of the office nor directly connected to the office network (such as an office PBX). The system 10 also allows the remote device 70 to operate as an independent PDA, wireless telephone, etc. if so desired. That is, the remote device 70 may receive calls placed to its (non-office) DID telephone number even though the system 10 also routes PBX calls to the device 70. In addition, the system 10 essentially implements all or part of call management functions typically available on a device that is part of an office, enterprise or hotel PBX or other communications network. Some of these features are discussed in detail below.

The system 10 as particularly illustrated herein includes a conventional office PBX network 11. The PBX network 11 may include a plurality of standard telephones 12a, 12b respectively connected to a conventional PBX/IP-PBX 14 via communication lines 18a, 18b. Although PBX network 11 may use a PBX or IP-PBX 14, the following disclosure will simply refer to PBX 14 for convenience purposes. The PBX 14 is connected to a calling network such as a public switched telephone network (PSTN) 16 by a primary rate interface (PRI) connection 20 or other suitable communication line or medium. The standard telephones 12a, 12b can be any digital or analog telephone or other communication device known in the art. As illustrated in FIG. 1, the first telephone 12a is a digital telephone while the second telephone 12b is an analog telephone. For clarity purposes only, two telephones 12a, 12b are illustrated in FIG. 1, but it should be appreciated that any number or combination of telephones or other communication devices can be supported by the system 10. Moreover, although it is desirable to use digital telephones, the embodiments are not to be limited to the particular type of telephone used in the system 10.

The PBX 14 is coupled to a server 30 constructed in accordance with an embodiment discussed in more detail below. The server 30 is connected to the PBX 14 in this embodiment by a PRI connection 22, VoIP connection 24 (if PBX 14 is an IP-PBX), or other suitable communication medium (e.g., WiFi connection). The server 30 is also connected to a PSTN 54 by a PRI connection or other suitable digital communication medium. The illustrated PRI connection between the server 30 and the PSTN 54 includes a first PRI connection 32, a channel service unit (CSU) 34, and a second PRI connection 36. A CSU is a mechanism for connecting a computer (or other device) to a digital medium that allows a customer to utilize their own equipment to retime and regenerate incoming signals. It should be appreciated that the illustrated connection between the server 30 and the PSTN 54 is one of many suitable connections. Accordingly, the embodiments disclosed should not be limited to the illustrated connection. The server 30 is one of the mechanisms that allows the integration of remote devices (e.g., mobile device 70) into the PBX network 11 and its operation will be described below in more detail. Moreover the server 30 maintains control over inbound, outgoing and inprogress calls and communications.

The server 30 is preferably connected to a local area network (LAN) 40 by an appropriate communication medium 38. Although a LAN 40 is illustrated, it should be appreciated that any other network, be it wired or wireless or a combination thereof, could be used. A plurality of computers (e.g., 42a, 42b) may be respectively connected to the LAN 40 by any appropriate communication lines 44a, 44b. The computers 42a, 42b can be used by network administrators or others to maintain server 30 and other portions of the system 10. The LAN 40 may also be connected to the Internet 50 by a suitable communication medium 48. A firewall 46 may be used for security purposes. In accordance with an embodiment, Internet 50 can be used to allow a remote administration device 52

(e.g., a personal computer) to perform remote administration of server 30 by office personnel or other authorized users of the system 10. Remote administration will allow office personnel to set user preferences for particular telephone extensions. Thus, each office telephone extension and associated remote device is individually configurable.

PSTN 54 is connected in this embodiment to a commercial wireless carrier (or other carrier not co-located with the system 10) by a wireless switch 58 or other wireless carrier equipment by an appropriate communication medium 56. The wireless switch 58 is connected to at least one antenna 60 (by an appropriate communication medium 62) for transmitting signals 64 to a wireless remote device 70. The wireless remote device 70 could also be a pager, wireless telephone, cellular telephone, or other wireless communication device. It may be desirable for the remote device 70 to be capable of handling both (or either) digital and analog communication signals. It should be noted that any type of wireless communication protocol (or a combination of different protocols), such as TDMA, CDMA, GSM, AMPS, MSR, iDEN, WAP, WiFi, etc., could be used.

It should be appreciated that the server 30 can be connected to a wireless carrier through a PSTN 54 and not by unique hardware or an in-office cellular network. As a result, server 30 only has to interface with conventional components, such as the PBX 14 and PSTN 54. Thus, the system 10 can be substantially technology independent. Moreover, special wireless devices are not required, which allows the remote device 70 to function in its conventional manner (e.g., as a separate mobile device) and as part of the PBX network 11 (if so desired). The PSTN 54 e.g., will send calls placed to the DID phone numbers associated with the PBX extensions to the server where the server 30 resolves the called number and performs the call processing discussed below.

The server 30 and the PBX 14 may also be connected to an accounting/billing system 80. The billing system 80 may also be connected to the LAN 40 so that system administrators may access the contents of the billing system 80. By incorporating a billing system 80 into the system 10, it is possible to obtain immediate billing information for calls placed to/from the remote device 70 or other remote device. This immediate billing feature is not present in other communication networks such as office PBXs or enterprise networks and is particularly useful for corporate environments such as law firms and government agencies, and hotel environments, where up to date billing information is essential.

As noted above, the server 30 allows for the full integration of remote devices into the PBX network 11. In accordance with an embodiment, server 30 is a processor-based standalone unit capable of handling communications directed to the PBX network 11. In a first embodiment, shown in FIG. 2, server 30 comprises a plurality of receiving and transmitting modules 220a, 220b, 220c, first and second buses 275, 285, at least one processor module (Processor Obj) 250, a network interface card 240 and a memory module operable to comprise a database 270 such as for example, a relational database management system (RDBMS). Further, server 30 can include a web-based user interface (UI) processor module 265, a SIP proxy server module 280 and a plurality of flop files 290a, 290b, 290c. The processor, UI and SIP proxy server modules 250, 265, 280 can be implemented, separately, or together, as one or more processor cards (example hardware components of these cards are described below in more detail with reference to FIG. 4) containing source code, object modules, scripts, or other programming to perform the following functions.

The SIP proxy server module 280 receives session initiation protocol (SIP) messages from user agents and acts on their behalf in forwarding or responding to those messages. In essence, the SIP proxy server module 280 is a gateway for IP-based interfaces to the server 30. The SIP proxy server module 280 also adds services, features and scalability to SIP networks. The SIP proxy server module 280 typically includes a registration service and a SIP location database, in addition to the SIP proxy.

Server 30 can receive an incoming call 210 and/or place an outgoing call 215 (described below in more detail). The processor module 250, among other things, directs and instructs the call processing of the server 30. The memory module comprising database 270 is used for storing user preferences and other pertinent information and may be a separate card or included within one of the other modules. The memory module may also be located external to the server 30, if desired, and connected to the server 30 by any wired or wireless communication medium.

Figure 4:
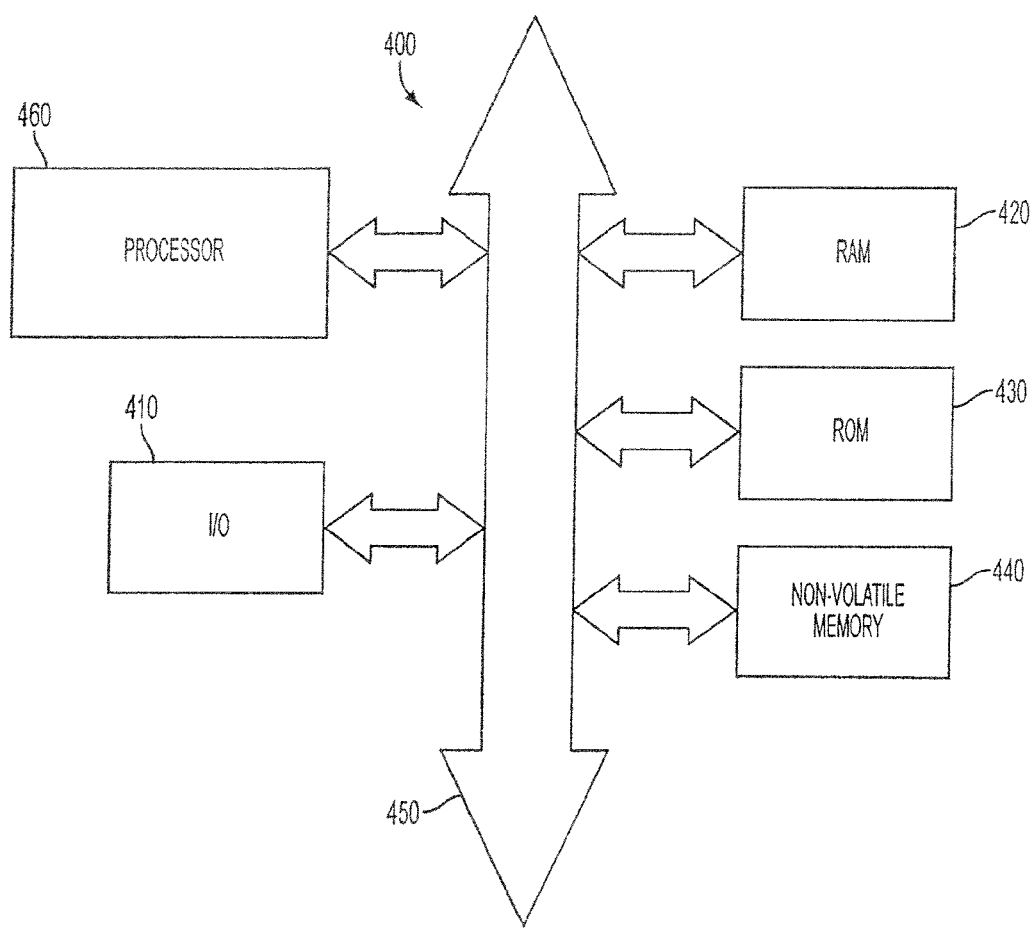
FIG. 4 illustrates a processor module in accordance with an embodiment disclosed herein.

FIG. 4 illustrates an example processor card 400, which may be used for the processor, UI and SIP proxy server modules 250, 265, 280, respectively. The card 400 includes a processor 460 for executing the processes of processor module 250 (or the other modules) that communicates with various other devices of the card 400 over a bus 450. These devices may include random access memory (RAM) 420, read-only memory (ROM) 430 and non-volatile memory 440. An input/output device (I/O) 410 provides communication into and out of the card 400. While one input/output device 410 is shown, there may be multiple I/O devices included on the card as desired. Source code, or other programming, comprising applications required by or performed by the components of the server 30 may be stored on one of the computer readable storage media on the card 400 (e.g., ROM 430, non-volatile memory 440) and executed by the processor 460.

Figure 2:
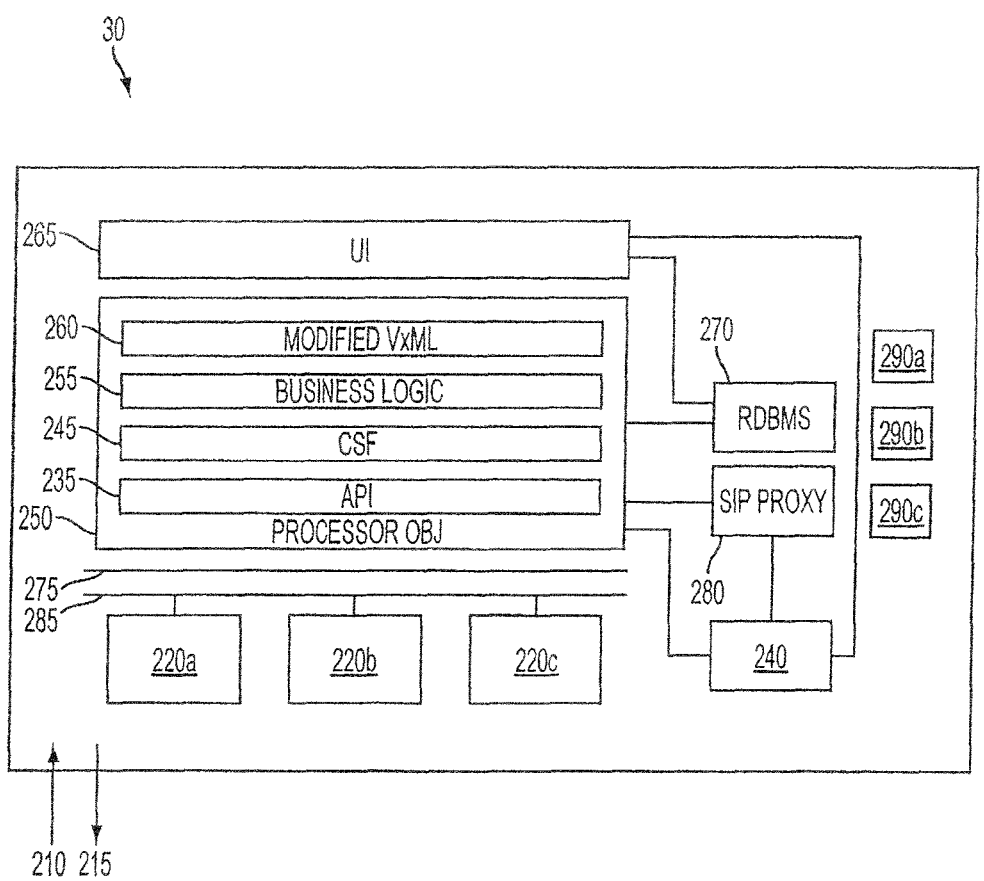
FIG. 2 illustrates a server unit in accordance with an embodiment disclosed herein.

Referring now to FIG. 2 and FIG. 4, the processor module 250 executes one or more computer programs or applications (Obj) stored in one or more memory units within (e.g., as shown in FIG. 4) or coupled to the processor module 250. Processor module 250 can include one or more processes such as a modified VxML 260 call flow process, business logic process 255, call service function (CSF) process 245, and a global application processing interface (API) process 235. It should be appreciated that processor module 250 can include one, all, or any combination of the processes described. The processor module 250 may also contain one or more additional databases and/or other processing memory used during the overall operation of system 10.

In one embodiment, the business logic process 255 can be used for determining whether or not a calling party (incoming or outgoing) is a participant of the server 30 network and allows the server 30 to be flexibly configured by providing routing plans and route translations, Interactive Voice Response (IVR) prompting and announcements, data manipulation, management and control. In another embodiment, the business logic 255 provides an intelligent call routing function (described below in more detail). The UI module 265 includes processes that provide an easy, but powerful, user interface to administer, configure and manage applications including the management of system, user, conference, notification, IVR and voicemail applications, to name a few.

Figure 3:
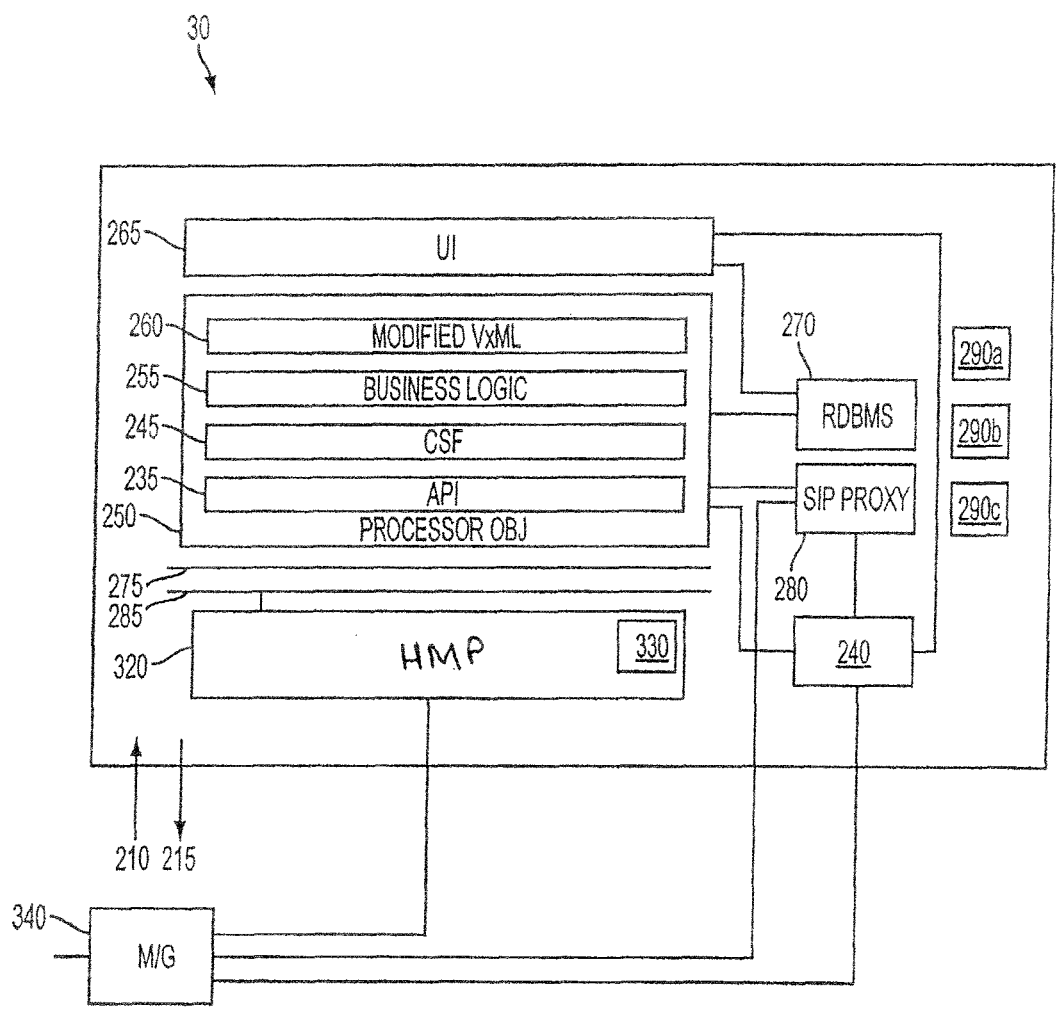
FIG. 3 illustrates a server unit in accordance with another embodiment disclosed herein.

The plurality of receiving and transmitting modules 220a, 220b, 220c communicate with and handle incoming and outgoing telephone calls and are connected along bus 285. In one embodiment, bus 285 is an H100 or similar bus. The receiving and transmitting modules 220a, 220b, 220c may be telephonic cards such as e.g., Intel Dialogic cards, that communicate with processor module 250, database 270 and other components via bus 275 (for example, a PCI bus), which is bridged to bus 285 (bridge not shown), and are employed to receive and transmit information to the PBX 14 and PSTN 54 during call processing. The modules 220a, 220b, 220c also receive and transmit other information such as administrative information. In another embodiment as shown in FIG. 3, the receiving and transmitting modules 220a, 220b, 220c can also be implemented as a processor module 320 such as e.g., a Host Media Processing (HMP) processor having a memory 330 comprising a program that, when executed, causes the processor 320 to perform the desired telephony functions.

In one embodiment, the workload performed by the receiving and transmitting modules 220a, 220b, 220c, as well as some of the processing functions of processor module 250, are implemented using one or more conventional processor-based programmable telephony interface circuit cards (e.g., Intel Dialogic cards) used to interface server 30 with PBX 14 and the PSTN. The cards are programmed to perform the conventional telephony services required to place and receive calls, as well as being programmed to perform the unique call processing functions described below.

The server 30 preferably contains a database of office extension numbers (also referred to herein as PBX extensions) and DID telephone numbers associated with each existing PBX extension, the DID numbers being associated with one or more devices including one or more remote devices 70. The database will be stored on a computer readable storage medium, which may be part of (e.g., database 270) or connected to the server 30. The database may also contain a server-to-PBX extension (hereinafter referred to as a "SERVER-PBX extension") and one or more remote device telephone numbers associated with each PBX extension. In the illustrated embodiment, software running on the telephony modules 220a, 220b, 220c interfaces with the database to perform the various call processing functions discussed below.

In the embodiment illustrated in FIG. 1, the PBX 14 contains a coordinated dialing plan (CDP) steering table. The CDP steering table will be stored and retrieved from a computer readable storage medium, which may be part of or connected to the PBX 14. The CDP steering table directs the routing of some or all PBX extensions to the server 30 over the PRI 22 and VoIP 24 connections between the server 30 and the PBX 14. In addition, the CDP steering table of the PBX 14 directs the routing of all SERVER-PBX extensions received from the server 30 to the appropriate office telephone.

Figure 5A:
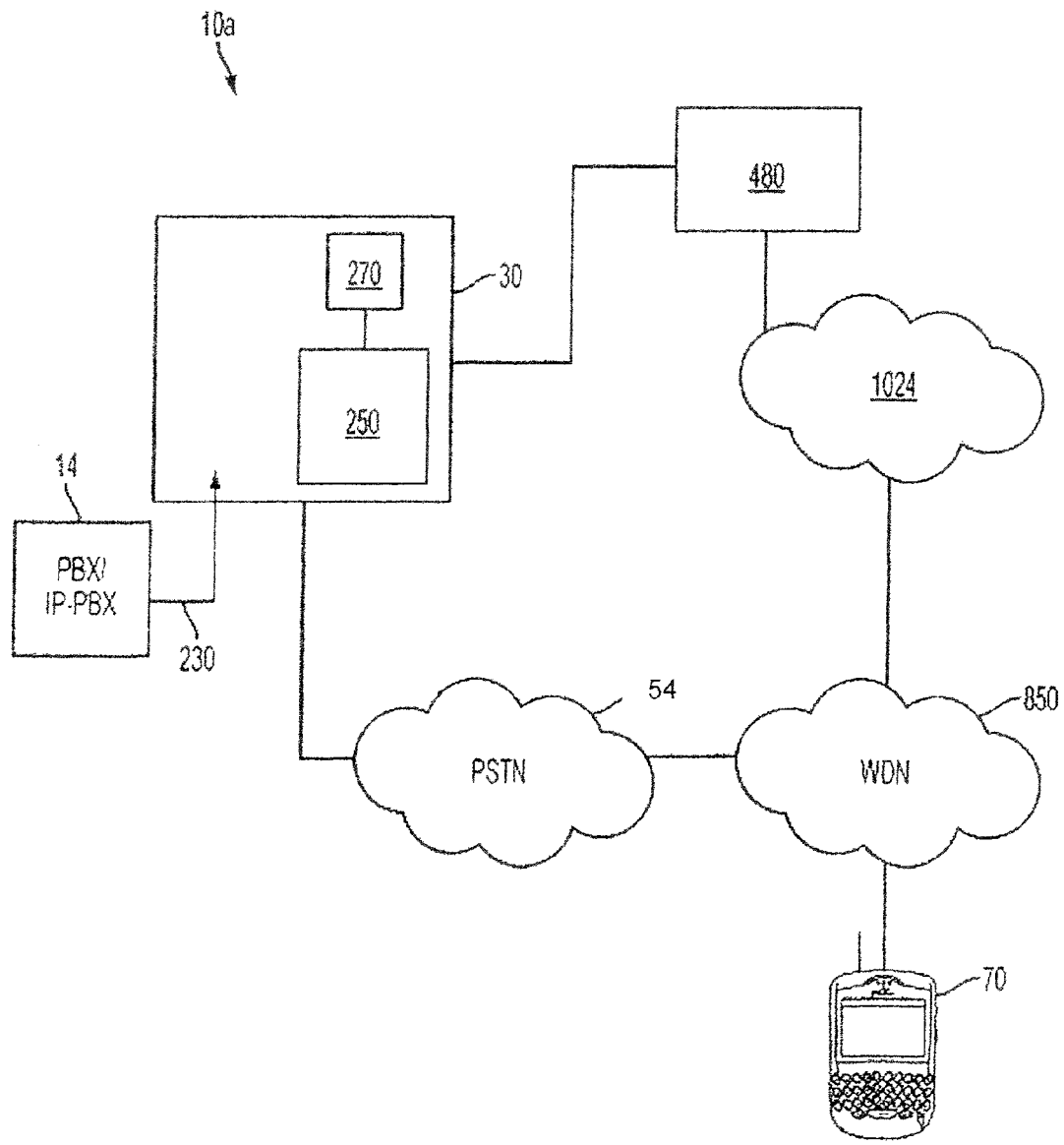
FIG. 5A illustrates another telecommunication system constructed in accordance with an embodiment disclosed herein.

FIG. 5A illustrates another example of a telecommunication system 10a constructed in accordance with another embodiment. System 10a comprises PBX 14, which is connected to server 30, including processor module 250 and database 270, via a PRI connection 230. As stated above, PBX 14 could also be an IP-PBX and thus, there can also be a VoIP connection between the server and PBX 14. There can also be a wireless connection (e.g., WiFi) if desired. Server 30 also includes components from FIG. 2 or 3 as desired, but the components are not illustrated for convenience purposes. The server 30 is connected to remote device 70 via a host system 480, network 1024 and wireless network (WDN) 850 (all of which are described in more detail below with respect to FIGS. 10 and 11). It should be appreciated that the communications between the server 30, host system 480 and remote device 70 may be encrypted to render the information in the communications (i.e., telephone numbers, user login identifications, system information and settings, etc.) indecipherable to the public. Although the use of encryption is desirable, the decision of whether encryption is to be used may be left up to the end user or system administrator of the remote device 70, host system 480 and/or server 30. The host system 480 can include a web services connection (i.e., for the Internet) to provide an interface between the server 30 and remote device 70. The host system 480 can also include a mobile data server (e.g., server 1174 of FIG. 11) for facilitating data communications between the server 30 and remote device 70. A PSTN 54 is also in communication with the server 30 and remote device 70.

The processor module 250 of the server 30 executes one or more programs stored in its associated memory to process calls received through the PBX 14 or PSTN 54. The remote device 70 will also contain a "client" application designed to communicate with the server 30 and perform the following processing in accordance with embodiments described herein. A suitable application architecture for the remote device 70 is disclosed in provisional application Ser. No. 60/852,639, which is hereby incorporated by reference in its entirety. A summary of the application architecture is now provided.

Figure 5B:
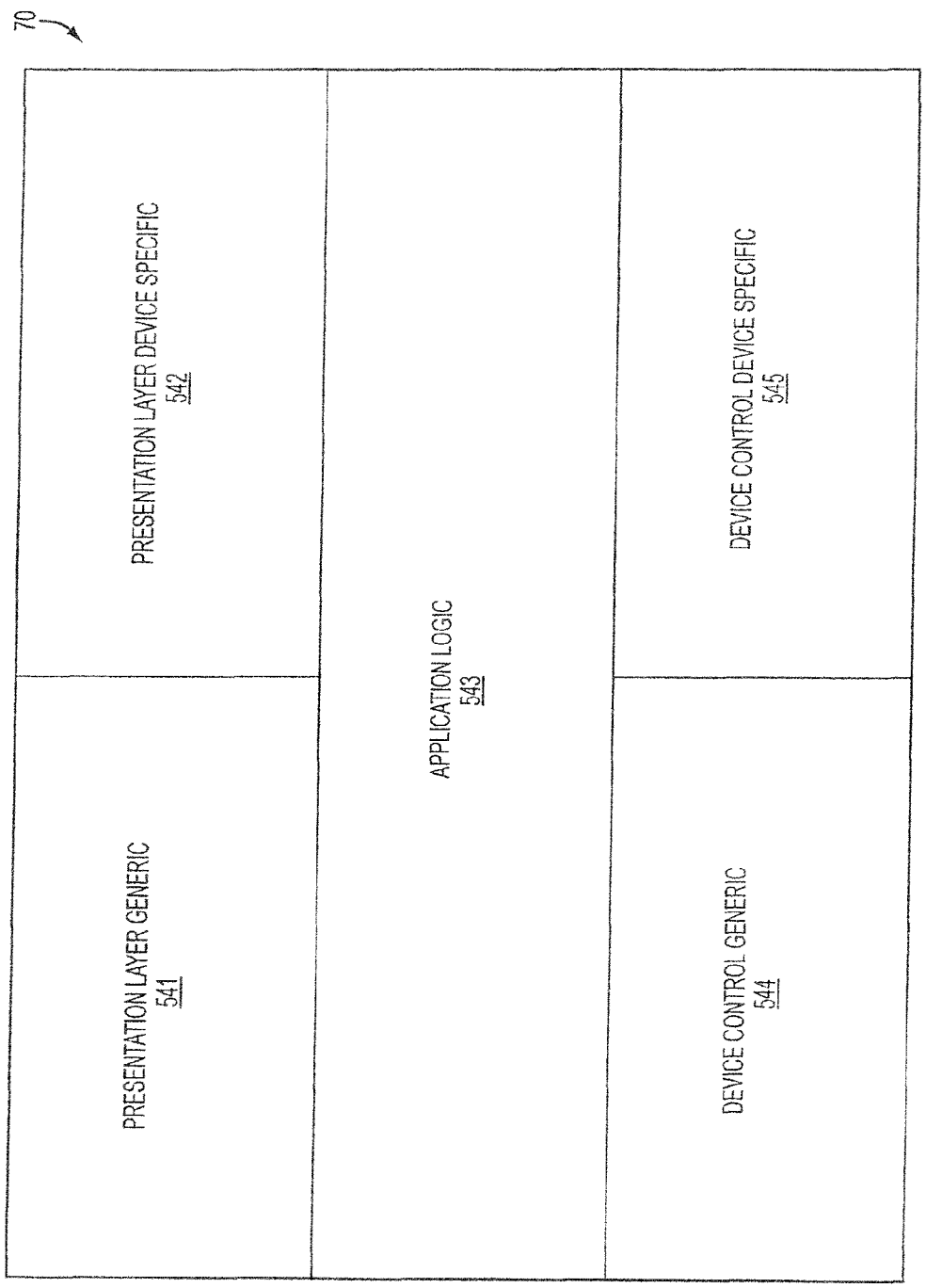
FIG. 5B illustrates a sample architecture for a remote device constructed in accordance with an embodiment disclosed herein.

FIG. 5B illustrates a sample architecture for remote device 70. The illustrated embodiment includes a generic presentation layer 541, device specific presentation layer 542, application logic 543, generic device control 544 and device specific device control 545. In general, the generic presentation layer 541 controls keypad and display functions. The device specific presentation layer 542 controls features specific to the device 70. For example, depending on the remote device 70, the features could include interfacing with a track wheel, track ball, or touch screen to name a few.

In the illustrated embodiment, the device 70 typically includes a screen with reasonable resolution and basic graphical capabilities. The device 70 will also have a basic user input system such as e.g., function keys, reduced or full-size keyboard, and/or a graphical input capability (e.g., touch screen). The device 70 will further include a data communications interface for one or more of GPRS/EGPRS, 1XRTT/EVDO, 802.11A/B/G, WiMAX, to name a few. The application running on the device 70 is designed as a generic application that has the capability to utilize the inherent interfaces of the device 70 (e.g., screen, input system and data communications).

The client application utilizes standard API's and built-in capabilities of the e.g., J2ME environment for the management of data presentation (layer 541) & device control (control 544). These standard capabilities allow for a level of generic data presentation, data input control and data messaging such as e.g., TCP/IP, UDP/IP, SMS, to name a few. In addition, each device manufacturer can also provide device specific API's, controls and/or capabilities that allow for greater integration to the device (i.e., device specific presentation layer 542, device specific device control 545). These are typically included as libraries that can be built, linked or packaged with the client application. These device specific controls include, but are not limited to, such features as e.g., thumbwheel control, track ball control, phone book access and controls, security controls and extensions and proprietary or device specific message controls.

The application logic 543 manages the inputs and outputs to and from the device 70 and processes this information in a ubiquitous way to provide the generic device client capabilities such as e.g., administration, inbound call management, outbound call management and mid-call (or call in progress) management. The application logic 543 is written in a way to abstract this logic from the device specific interfaces so all the functionality will work across all the devices supported. As new/future devices become supported, the differences between the client applications is minimized.

It should be appreciated that the interaction between remote device 70 and server 30 can include any call processing telephony functions such as simultaneous ring across multiple devices, single voicemail box, universal voice mail notification, answer acknowledgement, making and receiving a call, abbreviating extension dialing, call hold and retrieval, multiple call appearance, direct inward/outward dialing, post digit dialing, flexible dialing plans/international dialing, caller ID (name, number), voicemail notification, auto reconnect, callback, call forwarding, call transfer, call hold, call waiting, call mute, call blocking, call redial, call parking, speed dial, operator assisted dialing, Do Not Disturb (DND) i.e., forward calls to voicemail instead of the user, DND Bypass List (i.e., a list of names/numbers allowed to bypass the do not disturb feature), and DND Ignore List (i.e., a list of names/numbers to always divert to voicemail).

In accordance with an embodiment, the database of server 30 may also contain numerous system-defined user access rights and user modifiable preferences, which can alter the call processing described herein. Referring back to FIG. 1, an office administrator may use the network computers 42*a*, 42*b* or a remote administration device 52 to set user access rights and priorities. The user may use the remote administration device 52 or any device to set numerous user preferences. It is desirable that a Web-based or graphical user interface be used so that the user can easily access and set user preferences. The network computers 42*a*, 42*b* (or remote device 52) may also be used by the user if so desired.

It should be appreciated that the system could utilize "voice over IP" communications (i.e., voice over a data network) with appropriate remote devices. Many of today's wireless telephones and PDA's have the ability to place and receive cellular and data (voice over IP) telephone calls and to access the Internet or other data network. It should be appreciated that any conventional remote device could be used with system.

Similar to system 10, system 10*a* essentially implements all or part of call management functions typically available on a device that is part of an office, enterprise or hotel PBX or other communications network. Some of these features are discussed in detail below. Moreover, as will become apparent from the various call flow processes described in detail below, the server 30 maintains control over inbound, outgoing and in-progress calls and communications. In accordance with example embodiments, FIGS. 6A-6G illustrate the basic call processing flows that the server 30 (via processor module 250), host system 480 and remote device 70 may be programmed to handle and execute.

Figure 6A:
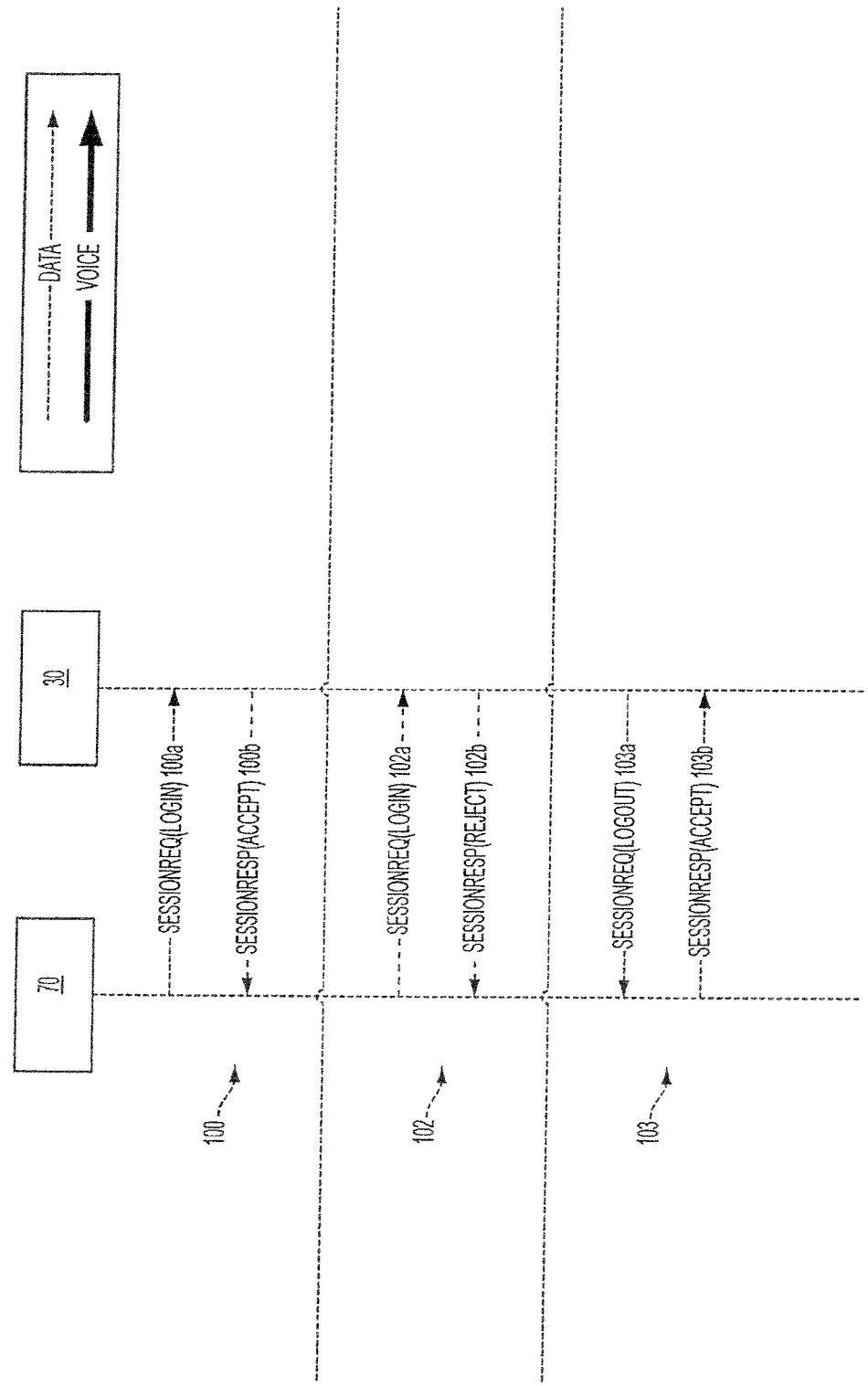
FIGS. 6A-6G illustrate embodiments of the operation of a system constructed in accordance with embodiments disclosed herein.

Referring to FIG. 6A, as shown in scenarios 100 and 102, initially a remote device 70 attempts to log into server 30 by sending a session request login data signal to the server 30 (flow lines 100*a*, 102*a*). In scenario 100, the user is communicating using remote device 70. For purposes of the illustrated examples, it is presumed that device 70 is a dual mode device capable of simultaneous voice and data communications. Device 70 could therefore be a remote device 70 capable of voice communications, a landline office telephone 12*a*, 12*b* or other wired/wireless telephony device capable of voice communications. In other embodiments, device 70, could be a single mode remote device 70 capable of communicating using either cellular voice services or data services at one time. In further embodiments, device 70 can also perform simultaneous communications using multiple radios.

As is described in more detail below, the message from the remote device 70 is sent through system 480 by any of the various supported methods. In response, the server 30 will either send a data signal to accept the login request (flow line 100*b*) (i.e., sends a session response accept data signal) or reject the login request (flow line 102*b*) (i.e., sends a session response reject data signal). The signals and the messages can be in the form of e.g., a voice signal, a DTMF tone, an SMS message, or any other form of a signal or message supported by device 70, system 480 and server 30. If the device 70 is accepted by the server 30, the user has access to server 30 and the ability to process calls in any of the methods described below. It should be appreciated that the login request may be performed automatically (e.g., every time the device 70 is powered-up, or periodically), it may happen manually when the user selects a predetermined device application, or it may happen automatically or manually in response to a request from the server 30.

Figure 5C:
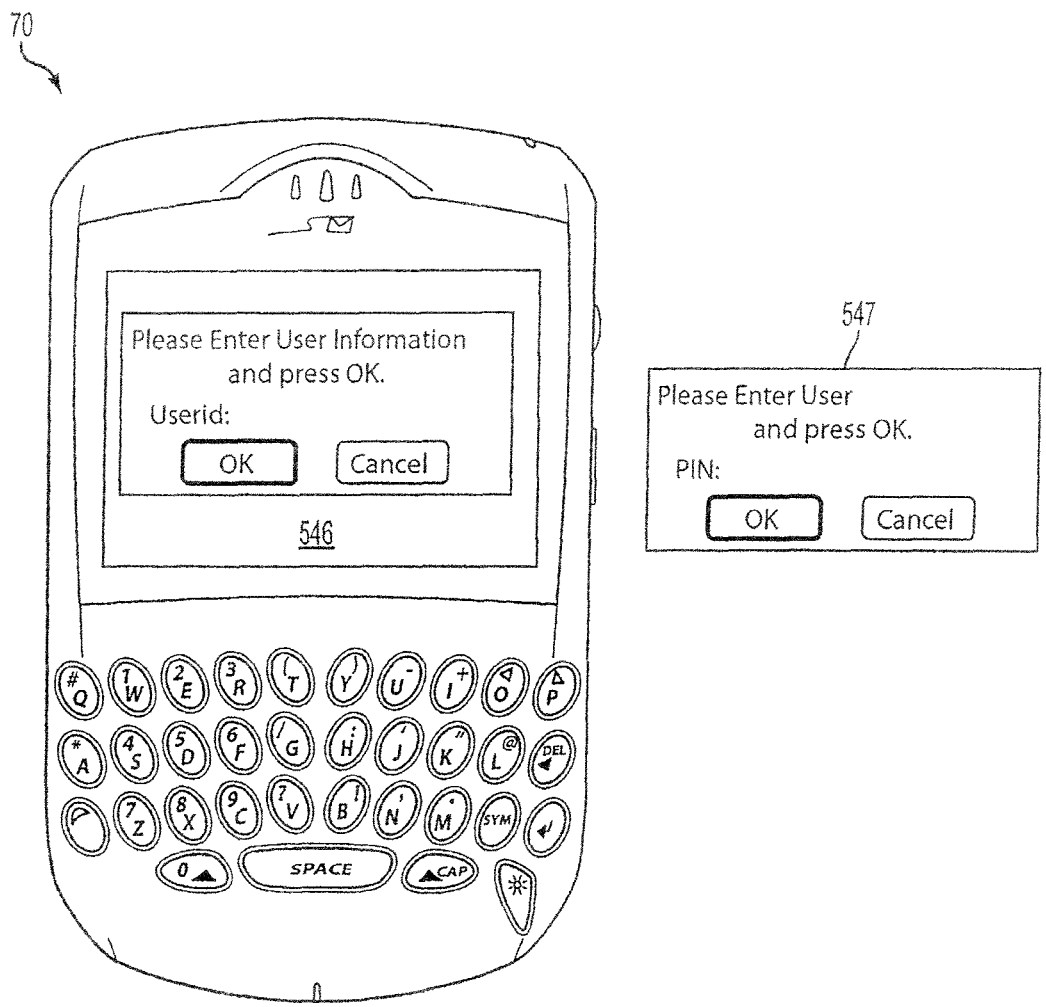
FIGS. 5C-5G illustrate examples of the user interface of a remote device constructed in accordance with an embodiment disclosed herein.

FIG. 5C shows an example of a user interface on the remote device 70 allowing the user to perform the login process. As illustrated, the user may be prompted for a user identification (Userid) 546 and then a password or personal identification number (PIN) 547 associated with the Userid. The keypad or track wheel may be used to enter the required information. It should be appreciated that FIG. 5C is just one example of how the user may interface with the remote device to initiate the login process.

At the end of a session or after a predetermined time period, as shown in scenario 103, the server 30 sends a session request logout data signal to the remote device 70 (flow line 103*a*). The remote device 70 responds with a session response accept data signal accepting the logout request from the server 30 (flow line 103*b*). It should be noted that the server 30 is initially programmed to require the remote device 70 to login about every 24 hours. The user (via device 70 and as shown below) or a server administrator (via server 30) can change this timing, as well as other system features and settings.

Figure 6B:
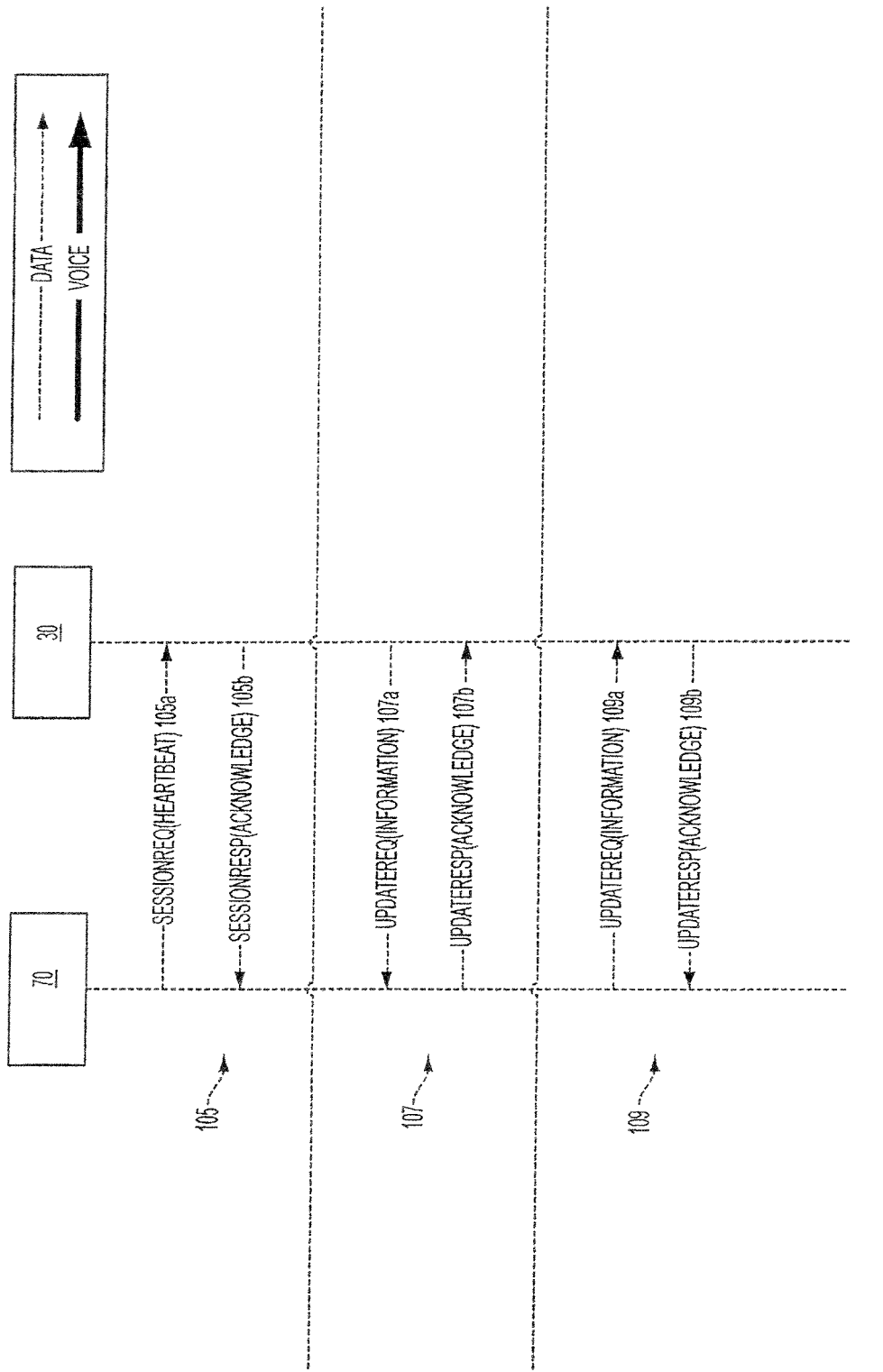

Remote device 70 and server 30 can periodically or continuously request information from each other using data signals as shown in FIG. 6B. In scenario 105, remote device 70 provides a session request heartbeat data signal to server 30 (flow line 105*a*) periodically or continuously (as set by default, user setting or system setting), which is acknowledged by server 30 in a session response acknowledge data signal (flow line 105*b*). In scenario 107, the server 30 sends an informational update request data signal to remote device 70 (flow line 107*a*), which is acknowledged by the device 70 in an update response acknowledge data signal (flow line 107*b*). Update signals from server 30 can include profile information, system settings, messages, etc.

In scenario 109, the remote device 70 sends an informational update request data signal to server 30 (flow line 109*a*) that is acknowledged by the server 30 in an update response acknowledge data signal (flow line 109*b*). Update signals from the remote device 70 can include profile information, Do Not Disturb information (DND), user preferences, device configuration settings, etc.

Figure 5D:
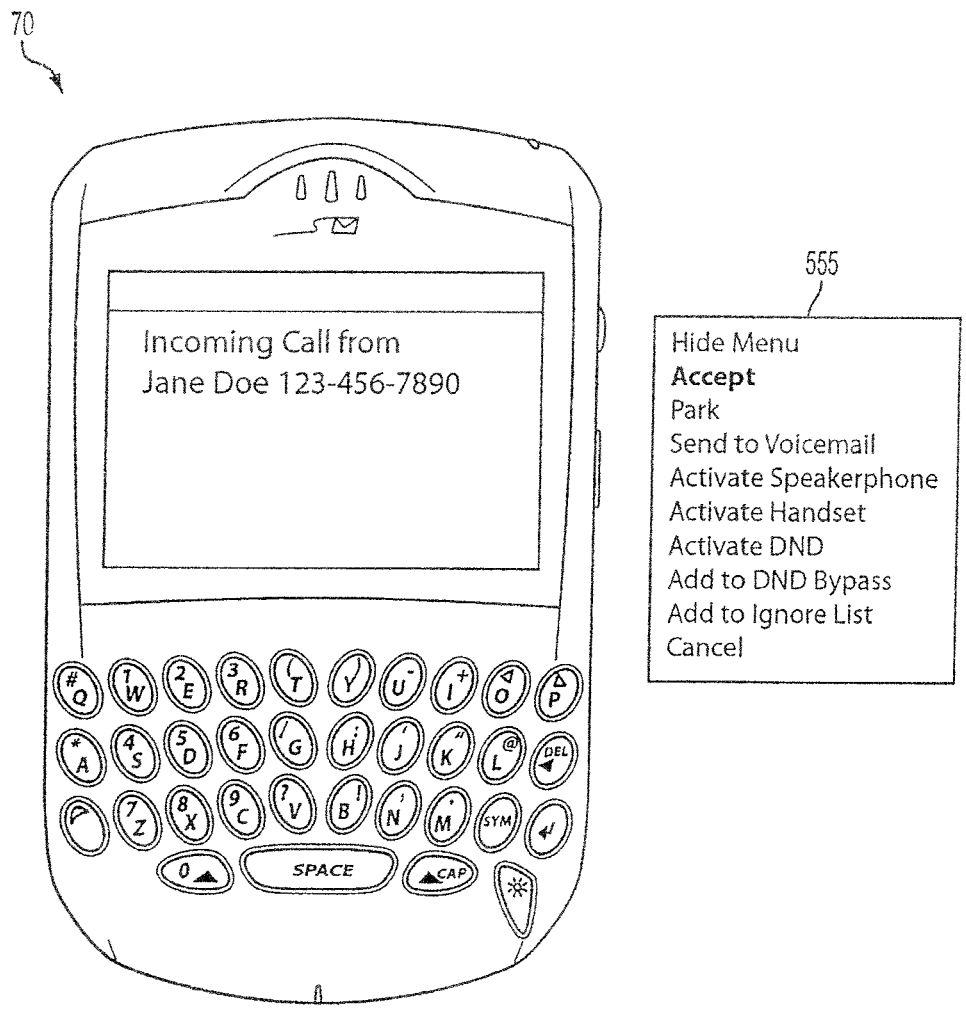
Figure 6C:
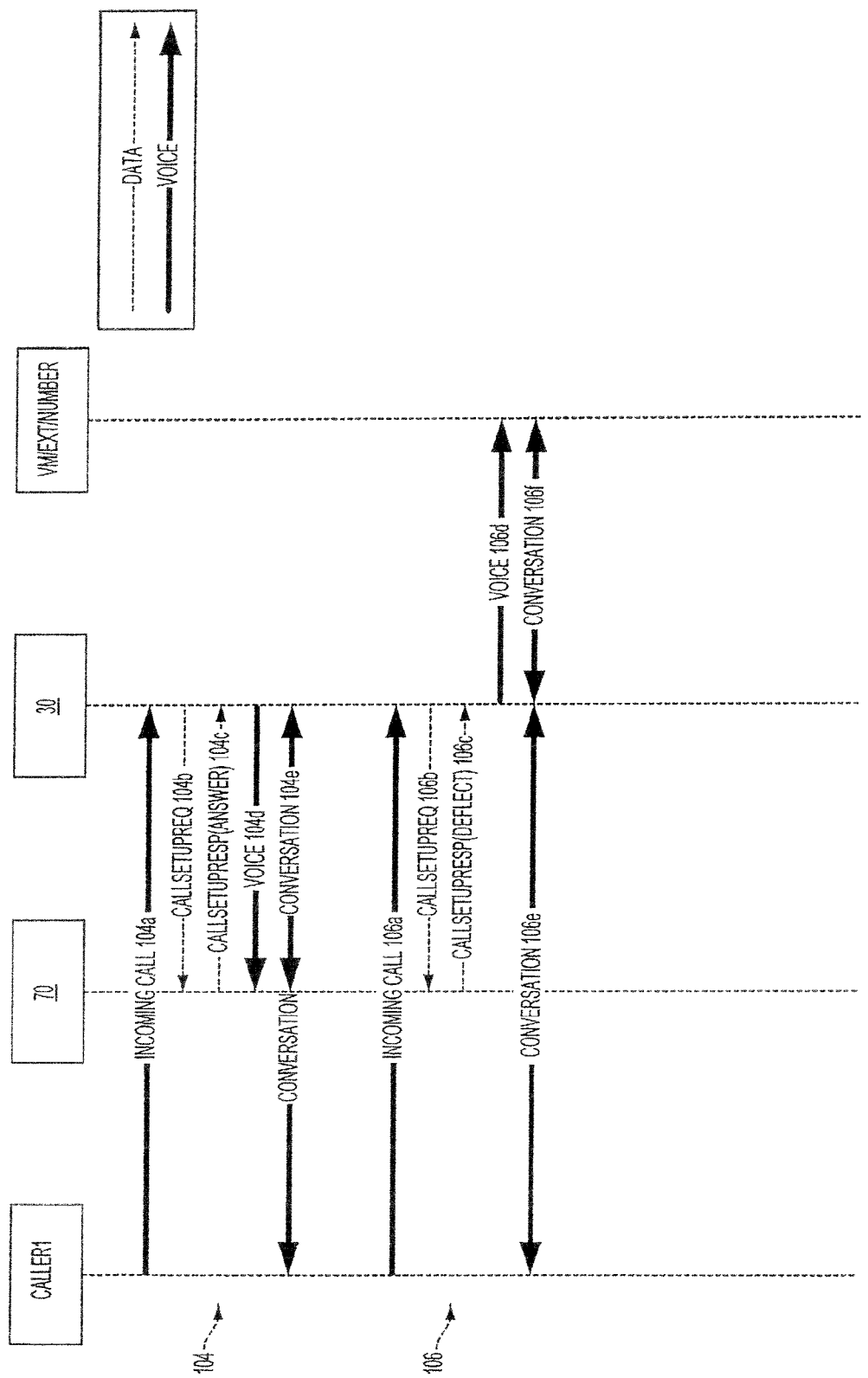

In scenario 104, as shown in FIG. 6C, a user can accept an incoming call placed to a PBX extension or DID telephone number by a caller (e.g., caller1). Server 30 receives an incoming voice call from the calling party (flow line 104*a*). Server 30 sends a call setup request data signal to the remote device 70 (flow line 104*b*) inquiring whether or not the user would like to accept the call. The call setup request data signal will cause an audible, visual and or vibrational indication to occur on the remote device 70 (as set by a user or system preference). For example, the call setup request data signal may cause the remote device 70 to play a ring, ring tone or other suitable audible indication. The call setup request data signal may cause the device 70 to display a textual or graphical message, pop-up or other visual notification (e.g., blinking LED on the device 70). FIG. 5D illustrates a textual message "Incoming Call from Jane Doe 123-456-7890" to alert the user of the caller. User responses may include, e.g., "answer" or "deflect". FIG. 5D illustrates options 555, which the user may select at this point. In scenario 104, the user chooses to answer the call by having the device 70 send a call setup response answer data signal to the server 30 (flow line 104*c*). This may be performed by selecting "accept" from the options 555 illustrated in FIG. 5D. In response, the server 30 will setup a voice call to the remote device (voice signal flow line 104*d*) and substantially seamlessly connect the calling party's incoming call to the remote device 70 via PSTN connection 450 (shown as voice signal flow line 104*e*). The user's acceptance or denial can be a manual input operation or automatic operation based on programmed user interfaces.

In scenario 106, the user of the remote device 70 wishes to deflect the inbound call to voicemail. In this scenario, server 30 receives an incoming voice call from the calling party (flow line 106*a*). Server 30 sends a call setup request data signal to the remote device 70 (flow line 106*b*) inquiring whether or not the user would like to accept the call. One or more of the above mentioned visual, audible and/or vibrational indications will be present at the remote device 70. The user chooses to deflect the call by having the device 70 send a call setup response deflect data signal to the server 30 (flow line 106*c*). This may be performed by selecting "send to voicemail" from the options 555 illustrated in FIG. 5D. In response, the server 30 will setup a voice call to e.g., the voicemail box associated with the user's PBX extension or other voicemail box setup by the user (voice signal flow line 106*d*). The server 30 connects the held calling party's incoming call to the voicemail box via PSTN connection 450 (shown as voice signal flow lines 106*e* and 106*f*). The calling party communicates via PSTN connection 450 with the user's voicemail via a connection path between the calling party and server 30 (flow line 106*e*), and another connection path between server 30 and the voicemail (flow line 106*f*).

Figure 5E:
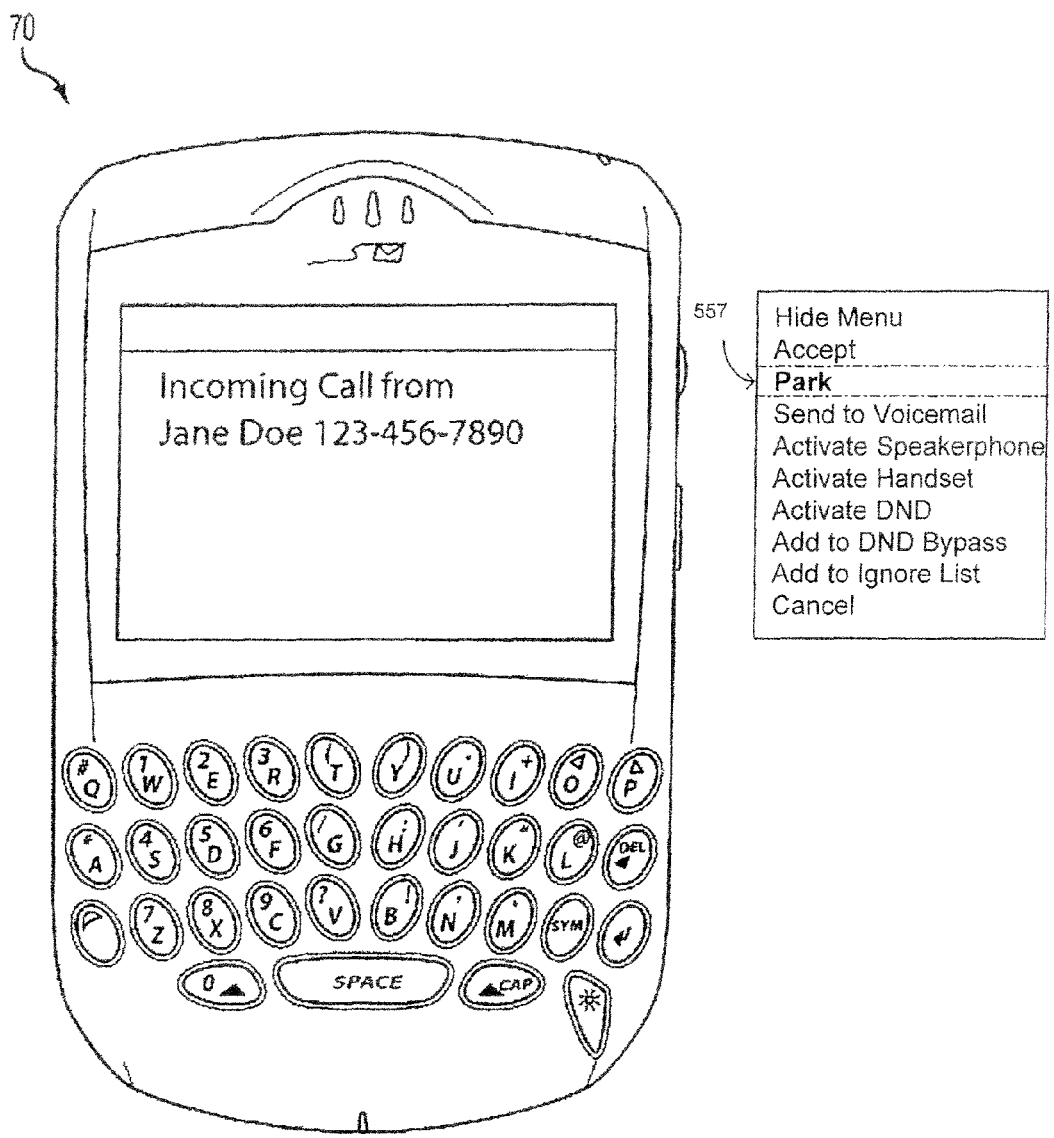
Figure 6D:
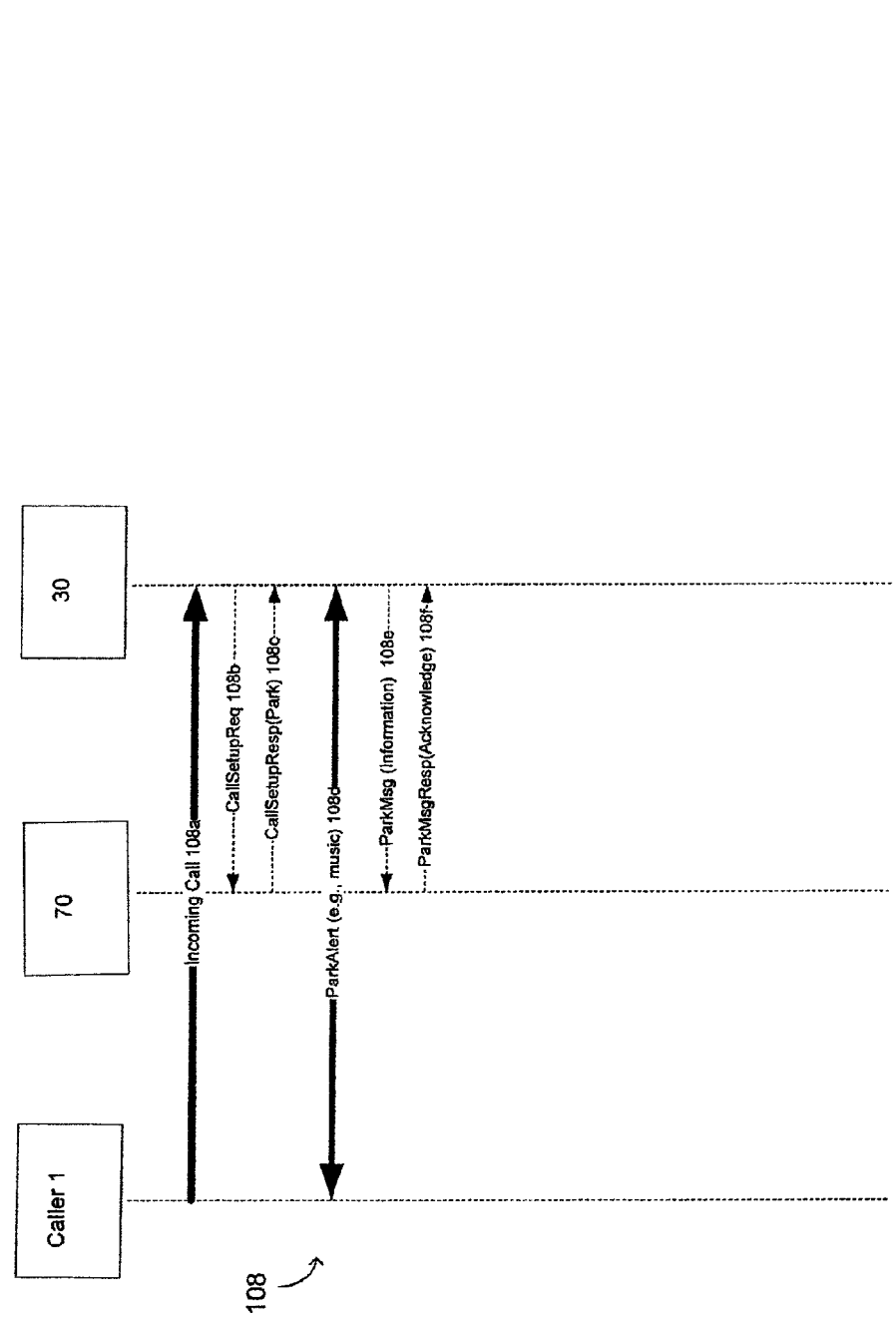

FIG. 5E illustrates a textual message "Incoming Call from Jane Doe 123-456-7890" to alert the user of the remote device 70 of the call, similar to the textual message of FIG. 5D. User responses may include, e.g., "accept" or "park." FIG. 5E illustrates option 557, by which the user may select to "park" the call instead of answering the call. In scenario 108, as shown in FIG. 6D, server 30 receives an incoming voice call from the calling party (flow line 108*a*). Server 30 sends a call setup request data signal to the remote device 70 (flow line 108*b*) inquiring whether or not the user would like to accept the call. One or more of the above mentioned visual, audible and/or vibrational indications will be present at the remote device 70. The user chooses to park the call by having the device 70 send a call setup response park data signal to the server 30 (flow line 108*c*). This may be performed, e.g., by selecting "park" 557 illustrated in FIG. 5E. In response, the server 30 will setup a park alert connection to the caller (flow line 108*d*), and output an audible tone voice message and/or music to alert the caller of the caller's parked status.

In the event that the user of remote device 70 becomes distracted and/or forgets that the caller has been placed in park, the server 30 sends a park reminder data message 108*e* to the remote device 70 to remind the user that a caller is currently placed in park. The remote device 70 acknowledges the park reminder message by sending a park reminder message response (flow line 108*f*). The acknowledgement can be automatically generated by the device 70 upon receiving the park reminder message 108*e* or can be in response to a user action initiated thereafter. Moreover, as described below, the park reminder message 122*e* can also result in the device 70 performing specific functions generating certain alerts.

The park reminder data message may be sent automatically in response to each park reminder message received. Alternatively, the park data signal may include a request for park reminder messages to be sent as part of the signal. The server 30 may send the park reminder message 108*e* after a predetermined time has passed after the user has parked the call; the length of the predetermined time may be controlled by the user's preference. For example, the park reminder message 108*e* may be sent after 10, 30, 45, or 60 seconds after the user has parked the caller. In addition, or alternatively, the park reminder message can include an indication of the predetermined length of time a parked call has been placed in park (e.g., 10, 30, 45, or 60 seconds). It should be noted that the predetermined times provided are merely examples and that the predetermined times may be set by the user or the system administrator. Moreover, the server 30 can periodically send the park reminder message 108*e* at the predetermined rate until Party 2 is un-parked (described below). The user preferences may be directly specified at the server 30, or the preferences may be communicated as part of the park data signal. Moreover, the preferences can also be specified or updated as part of the park reminder message response. Additionally, the park reminder message response may also include a request for terminating the sending of park reminder message 108*e*. In addition, or alternatively, the park reminder message may including an indication of the predetermined length of time discussed above or an accumulated time that the call has been parked.

Figure 6E:
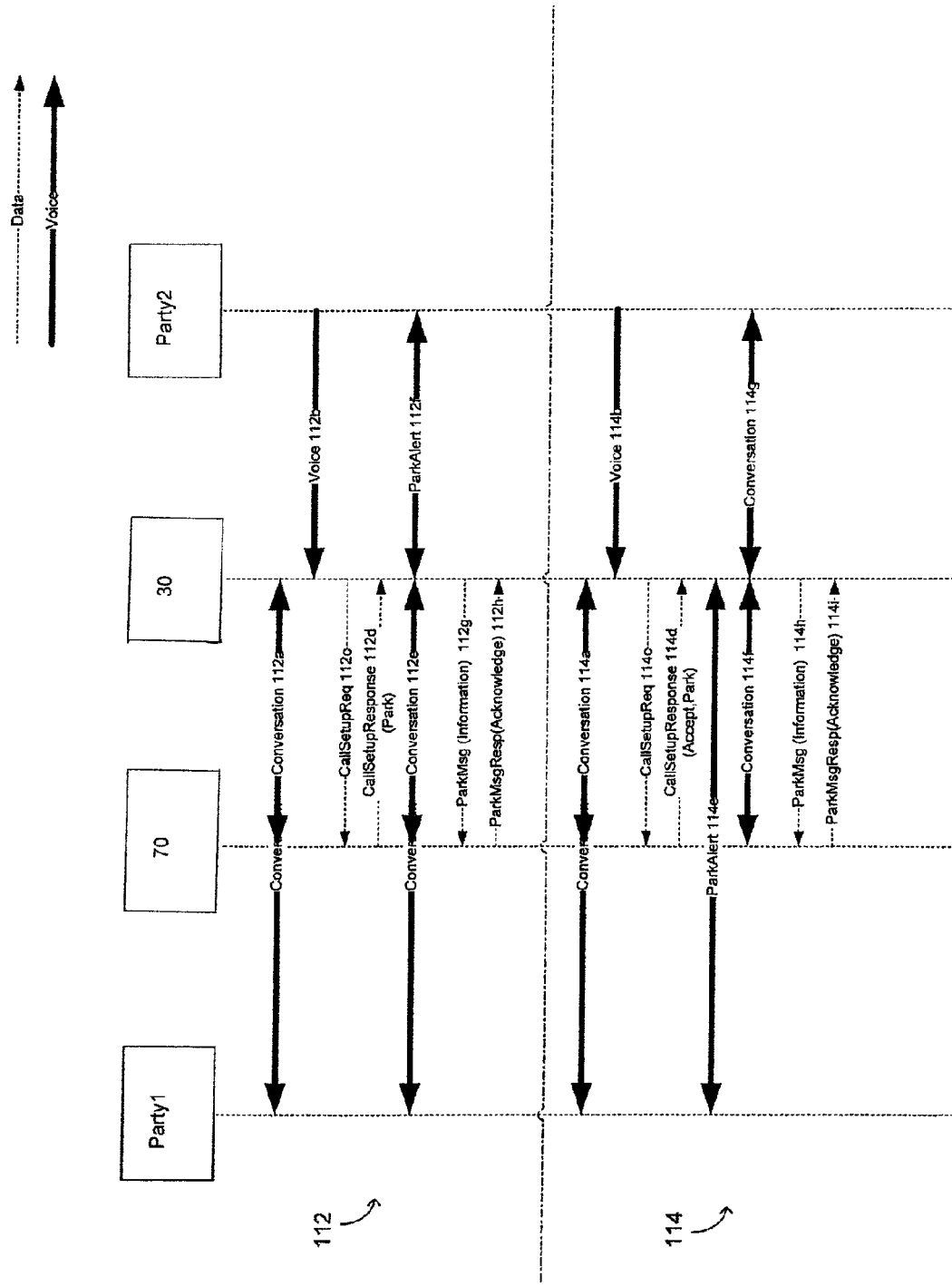

In scenario 112, as shown in FIG. 6E, a caller (party 1) is in voice communication with the server 30, which is in voice communication with the remote device 70, thereby allowing a conversation (flow line 112*a*) to occur between the caller (party 1) and the remote device 70. In the event that the server 30 receives an incoming voice call from a second calling party (party 2), shown as flow line 112*b*, the server 30 sends a call setup request data signal to the remote device 70 (flow line 112*c*) inquiring whether or not the user would like to accept the call. The user response may park the call, as discussed above with respect to FIGS. 5E and 6D (flow line 112*d*), and continue the voice communication with the first caller (party 1), shown as flow line 112*e*. In response, the server 30 will setup a park alert connection to the caller (flow line 112*f*), and output an audible tone, voice message and/or music to alert the caller of the caller's parked status.

In the event that the user becomes distracted and/or forgets that the second caller (party 2) has been placed in park, the server 30 sends a park data message 112*g* to the remote device 70 to remind the user that the second caller (party 2) is currently parked. The remote device 70 acknowledges the park reminder message by sending a park reminder message response (flow line 112*h*). The acknowledgement can be automatically generated by the device 70 upon receiving the park reminder message 112*g* or can be in response to a user action initiated thereafter. Moreover, as described below, the park reminder message 112*g* can also result in the device 70 performing specific functions for generating certain alerts. The server 30 may send the park reminder message 112*g* after a predetermined time, as discussed above with respect to FIG. 6D. Moreover, the server 30 will periodically send the park reminder message 112*g* at the predetermined rate until Party 2 is un-parked (described below).

In scenario 114, as shown in FIG. 6E, a caller (party 1) is in voice communication with the server 30, which is in voice communication with the remote device 70, thereby allowing a conversation (flow line 114a) to occur between the caller (party 1) and the remote device 70. In the event that the server 30 receives an incoming voice call from a second calling party (party 2), shown as flow line 114b, the server 30 sends a call setup request data signal to the remote device 70 (flow line 114c) inquiring whether or not the user would like to accept the call. The user response may be to accept the call, as discussed above with respect to FIGS. 5E and 6D (flow line 114d), and to park the first caller (party 1), shown as flow line 114e. The remote device 70 is in voice communication through the server 30 with the second caller (party 2), shown as flow lines 114f and 114g.

In the event that the user becomes distracted and/or forgets that the first caller (party 1) has been placed in park, the server 30 sends a park reminder message 114h to the remote device 70 to remind the user that the first caller (party 1) is currently placed in park. The remote device 70 acknowledges the park reminder message by sending a park reminder message response (flow line 114i). The acknowledgement can be automatically generated by the device 70 upon receiving the park reminder message 114h or can be in response to a user action initiated thereafter. Moreover, as described below, the park reminder message 114h can also result in the device 70 performing specific functions generating certain alerts. The server 30 may send the park reminder message 114h after a predetermined time, as discussed above with respect to FIG. 6D, which may be periodically sent until the caller is un-parked.

Figure 6F:
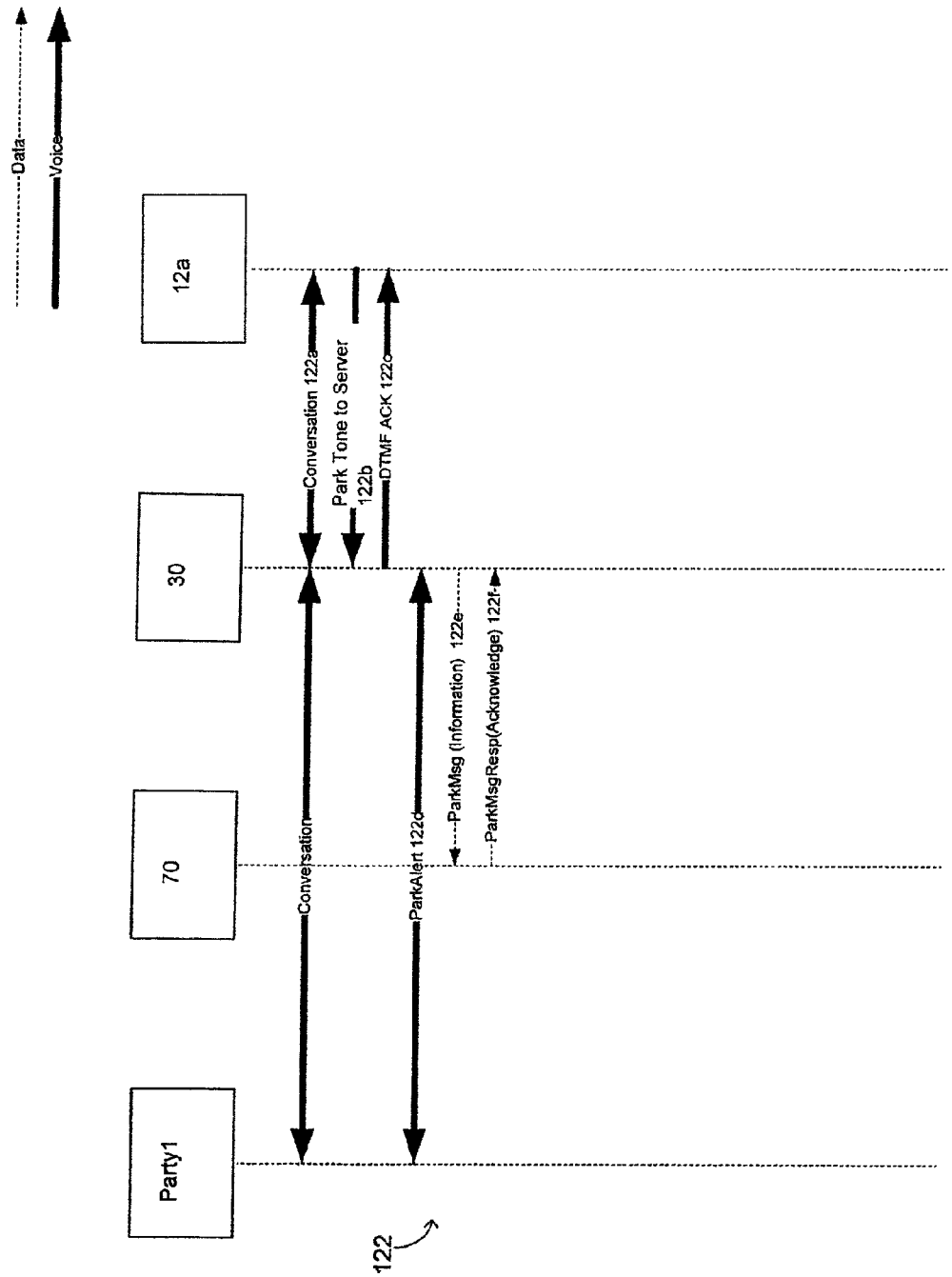

In scenario 122, shown in FIG. 6F, a caller (party 1) dials the phone number associated with the remote device 70, which is routed via the server 30. In the illustrated scenario, the server 30 routes the call to the remote device 70 to a second device such as, for example, an office telephone 12a (FIG. 1). The second device could also be any other landline phone registered in the user's user profile.

As shown by flow line 122a, the caller (party 1) and the office telephone 12a are in voice communication. A user may park the call by pressing a key that generates a tone on the office telephone 12a, as shown by flow line 122b. The use of a key press to park the call is exemplary only and, as will be apparent to a person of skill in the art that any variety of methods of parking a call can be employed. The park tone is accepted and acknowledged by the server 30, as shown by flow line 122c. In response, the server 30 will setup a park alert connection to the caller (flow line 122d), and output a tone, voice message and/or music to alert the caller of the caller's parked status.

In the event that the user walks away from his office telephone 12a, and/or forgets that the caller (party 1) has been parked, the server 30 sends a park reminder message (flow line 122e) to the user's remote device 70 to remind the user that the caller (party 1) is currently parked. The remote device 70 acknowledges the park reminder message by sending a park reminder message response (flow line 122f). The acknowledgement can be automatically generated by the device 70 upon receiving the park reminder message 122e or can be in response to a user action initiated thereafter. Moreover, as described below, the park reminder message 122e can also result in the device 70 performing specific functions generating certain alerts. The server 30 may send the park reminder message 122e after a predetermined time, as discussed above with respect to FIG. 6D, which may be periodically sent until the caller is un-parked.

Figure 5F:
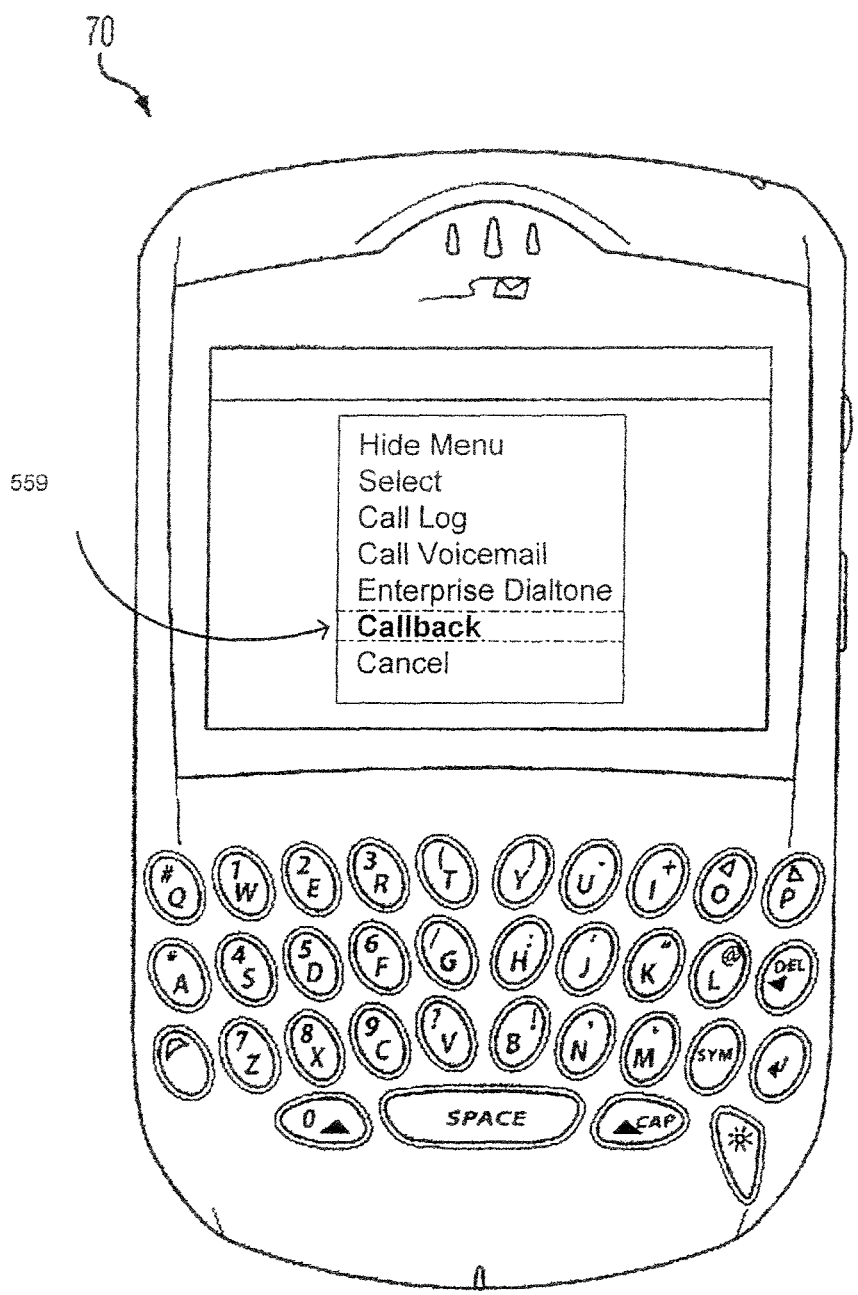
Figure 6G:
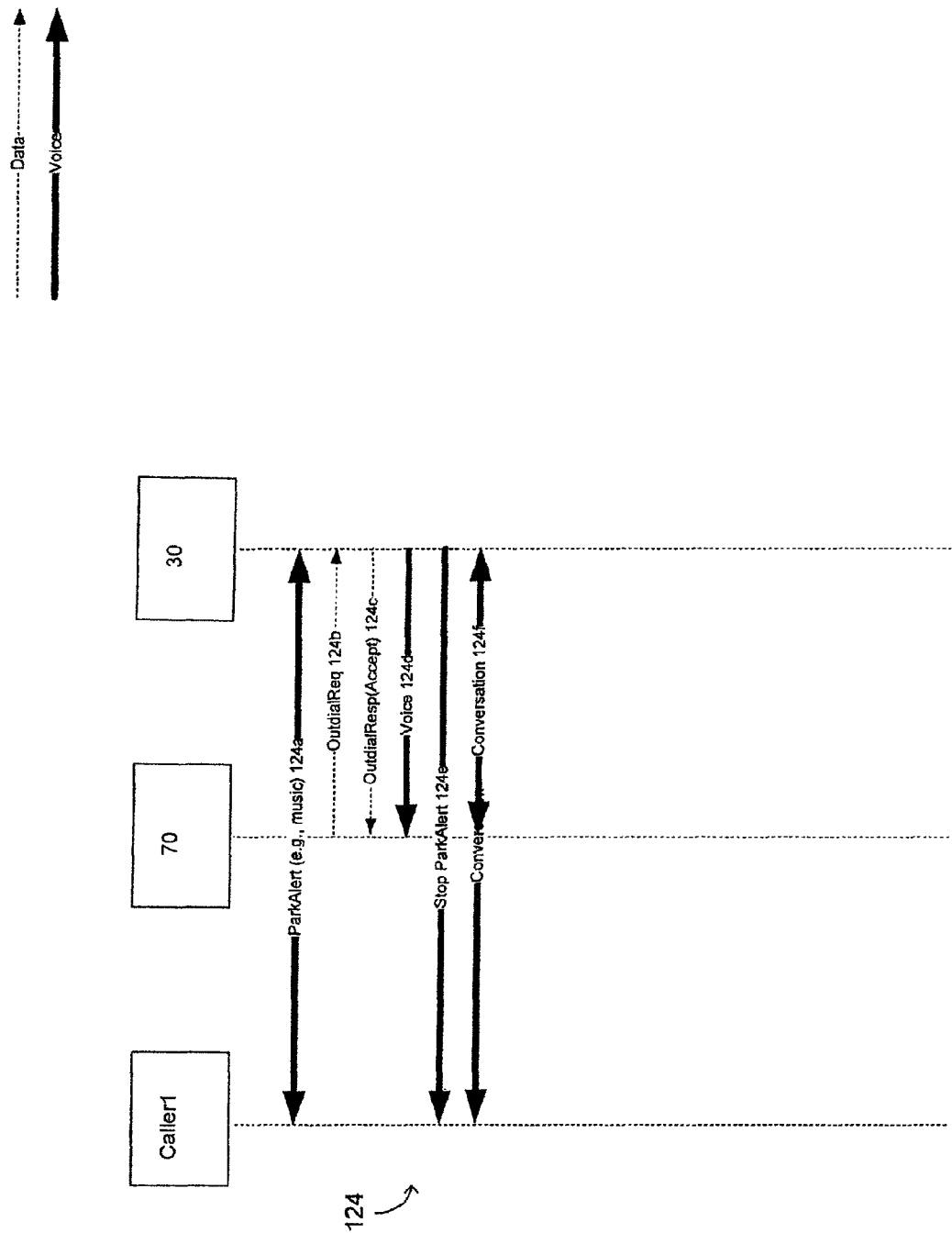

FIG. 6G illustrates one embodiment of removing a caller from park to set up a voice communication with the un-parked caller. As discussed above, when a user places a call in park, the server 30 may send a park alert such as, for example, music (flow line 124a) to the parked party; once a user desires to remove the caller (caller 1) from park, a key or a series of keys on the remote device can be selected to send an outdial request (flow line 124b) to the server 30. FIG. 5F illustrates one embodiment by which a user can select "callback" 559 on the remote device 70, which sends an outdial request 124b to the server 30.

The server 30 accepts and acknowledges the outdial request 124b by sending an outdial response to the remote device 70 (flow line 124c). The server 30 then sends a voice communication to the remote device 70 (flow line 124d). The server 30 also stops the park alert (e.g., music) that is communicated to the caller (flow line 124e). The caller (caller 1) and the remote device 70 are then in voice communication via the server 30 (flow line 124f), and the caller that was placed in park can now have a conversation with the user of the remote device 70.

Figure 5G:
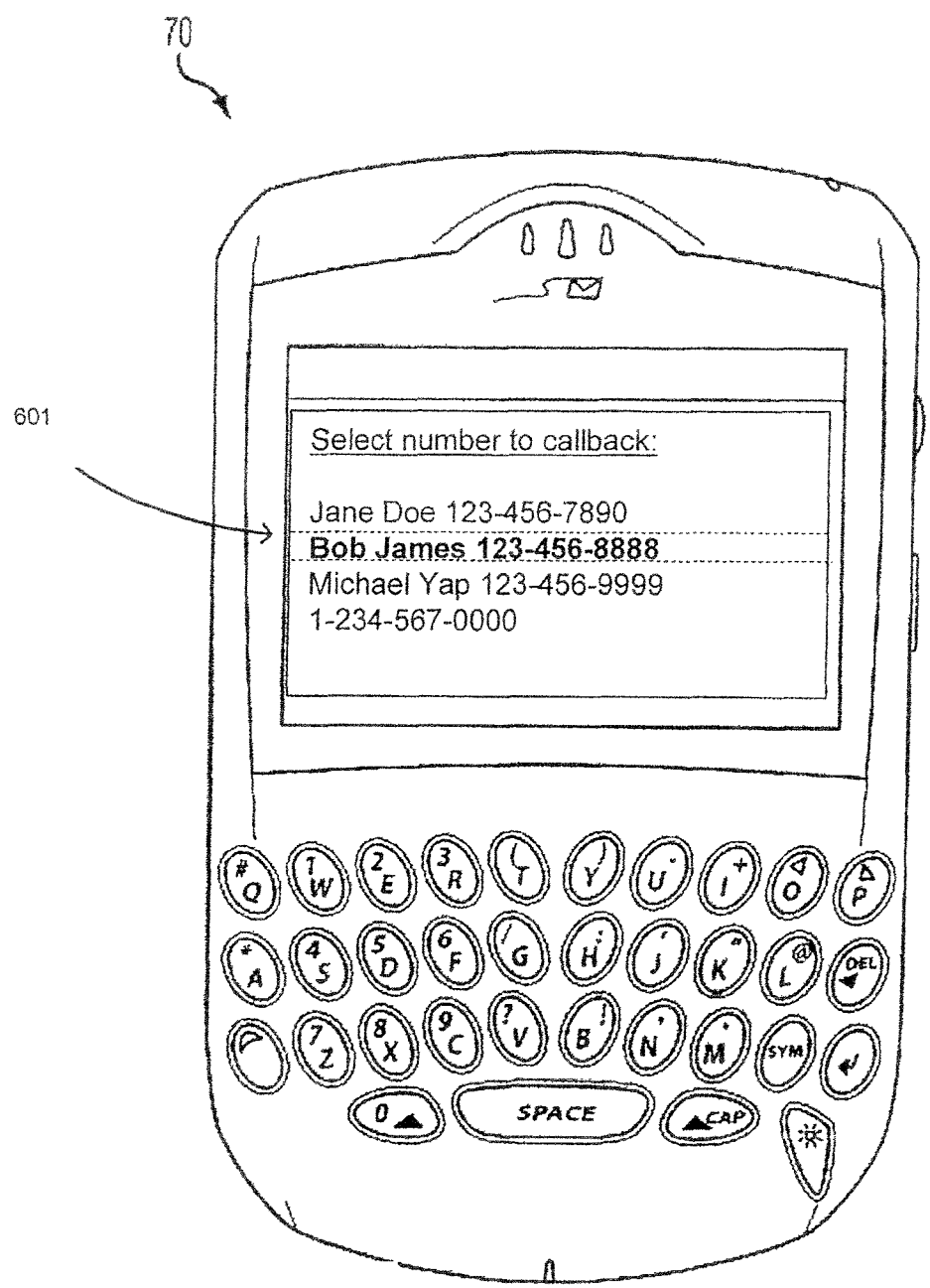

In the event that more than one caller is placed in park, as discussed above with respect to FIG. 6E, the user of the remote device 70 may select the callers from a list of callers that is depicted on the remote device. For example, FIG. 5G illustrates one embodiment by which a list 601 of callers is depicted, and the user may select (in this example) "Bob James" from a list of callers that have been parked. Once selected, the remote device 70, the caller (caller 1), and the server 30 are all in communication with one another, as discussed above with respect to FIG. 6G. It should be noted that the connection to one or more of the parked calls may be made automatically or manually, which can be set by user preferences or the administrator.

The user is also capable of placing outgoing calls from the remote device 70 through the server 30 (and thus, for example the PBX) in the following exemplary manner. If a user wants to place a call to party 1, the user has the remote device 70 send an out dial request data signal to server 30 requesting to place an outbound call through the server 30. Any input mechanism (e.g., keyboard, track wheel, stylus, etc.) may be used to send the out dial request from the remote device 70. Server 30 determines from the request whether the user and/or remote device 70 has sufficient rights to place the outbound call. Server 30 will respond by sending an out dial response accept data signal accepting the user's request, or by sending an out dial response reject data signal rejecting the outbound call to remote device 70 depending on the user's rights. If server 30 accepts the outbound call request, the server 30 will place an outbound voice call to the remote device 70 and another voice call to the called party (e.g., party 1). The server 30 then substantially seamlessly connects the two calls allowing voice communications between the called party and user of the remote device 70.

Like system 10, 10a also provides additional call processing while a call/connection is already in progress. That is, once a voice call between a user of a remote device 70 and another party ("party A") is in progress, the server 30 allows e.g., the user to conference in another party ("party B"), place party A on hold while accepting a call from or placing a call to party B, deflect a call from party B while continuing with the party A call, to name a few. All of these scenarios are possible because the server 30 maintains control over the ongoing call. Therefore, if during a call, party B attempts to call the user, server 30 will receive the call communication from party B and send a call setup request data signal to the remote device 70 alerting the device 70 to the new call. At this point, the user can send (via the remote device 70) a data signal accepting, deflecting or conferencing in the party B call. Based on the response, the server 30 makes the necessary call connections. Likewise, if during the call with party A, the user decides to call party B, the user can send (via the remote device 70) a data signal requesting the server 30 to call party B. The server 30 initiates the call to party B, and based on the user's request, can place party A on hold, send party A to voicemail, or join the calls to form a conference call. It should be appreciated that DTMF tones can also be used instead of data signals, if desired.

Figure 7A:
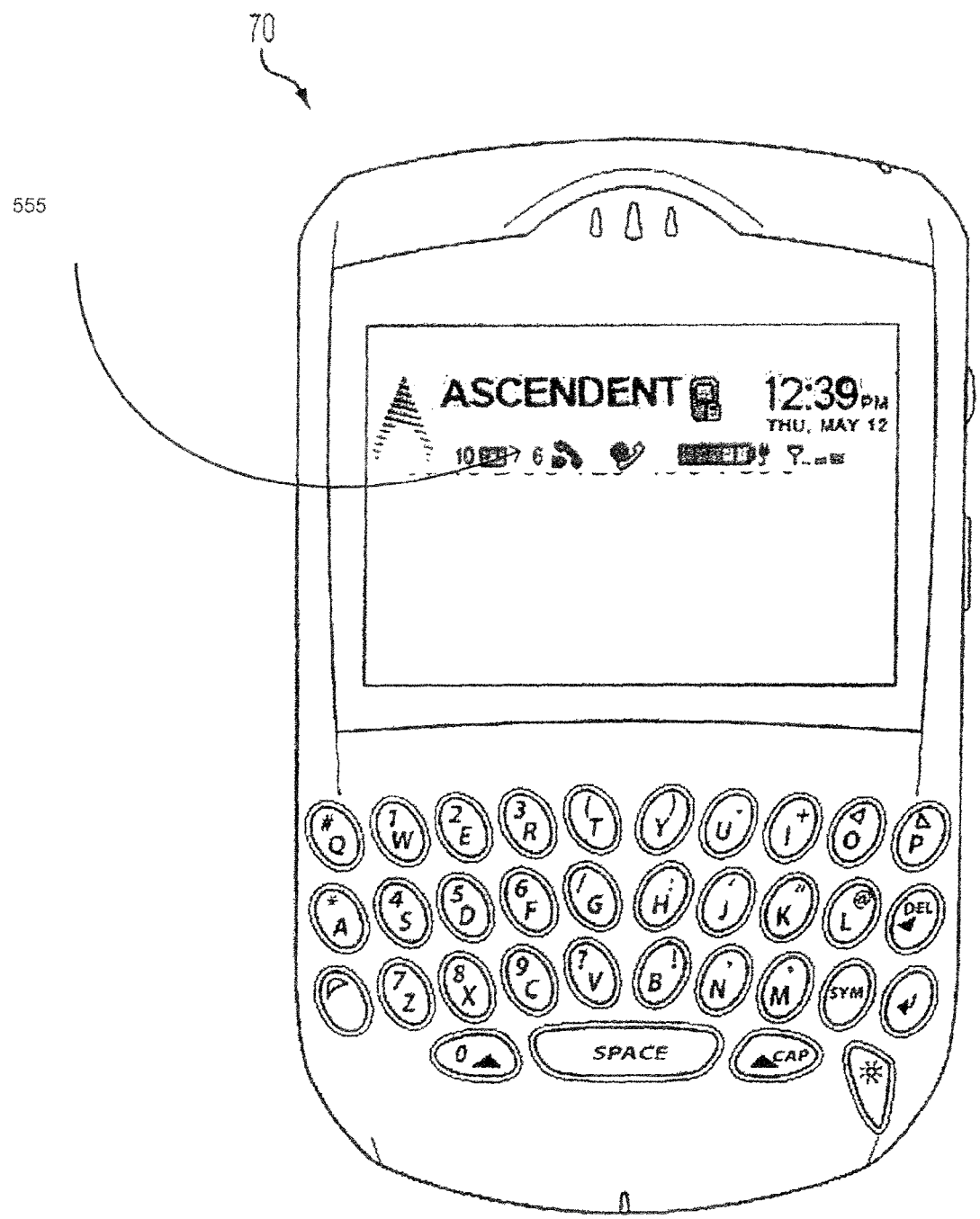
FIGS. 7A-7B illustrate further examples of the user interface of a remote device constructed in accordance with an embodiment disclosed herein.
Figure 7B:
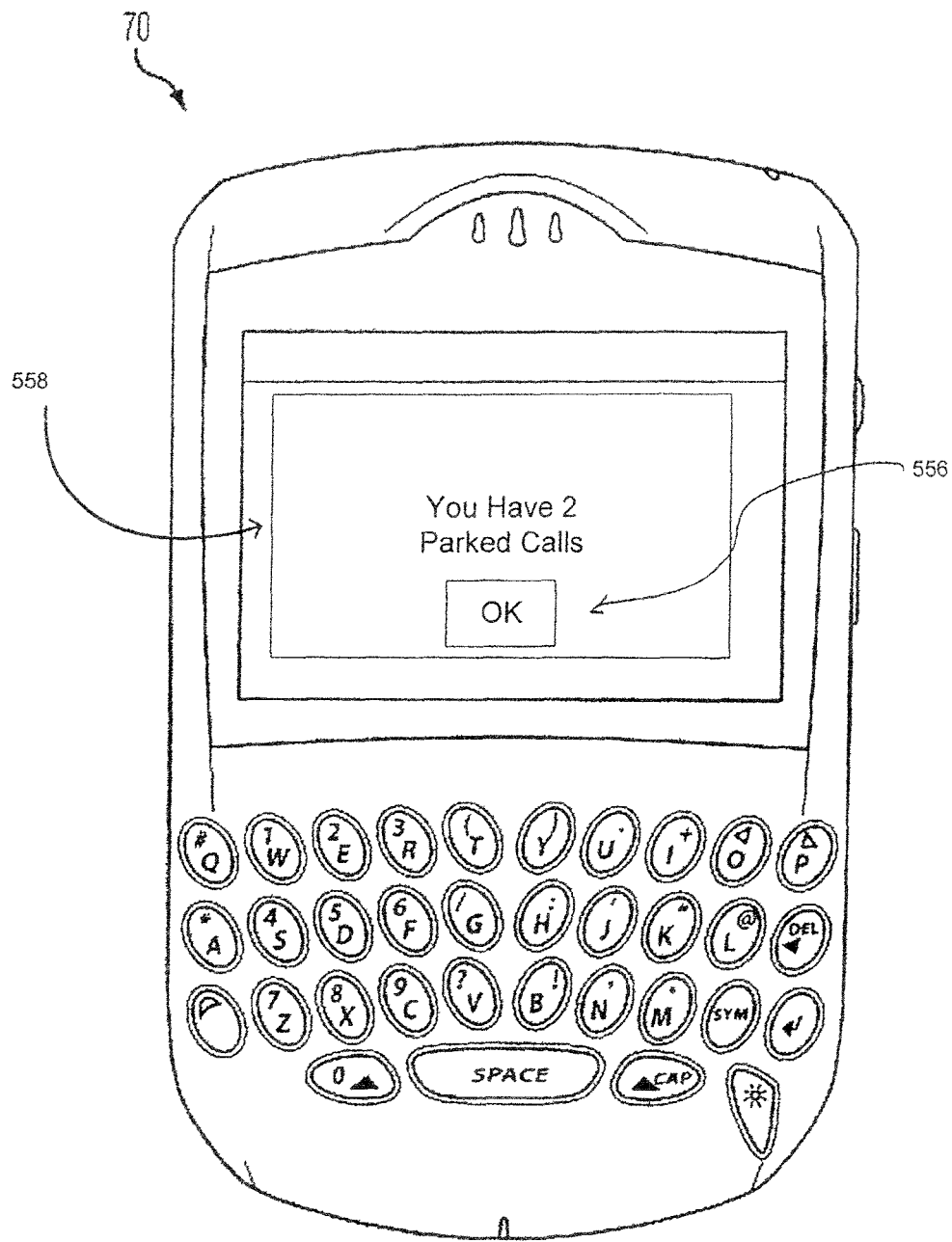

FIGS. 7A and 7B illustrate embodiments of the functions or alerts the device can perform upon receiving a park reminder message (e.g., flow line 108e of FIG. 6D) sent to the remote device 70 by server 30. The specific function to be performed (or the alert type) can be determined by settings stored within device 70, such settings being modifiable by a user in some embodiments, and by an administrator or provider of device 70 in other embodiments. The specific function to perform can also be determined on the basis of settings sent by server 30 that are a part of or accompanying the park reminder message. The determination of which function to use can also be performed on the basis of both specifications contained within the device and the specifications accompanying or contained within the park reminder message. For example, the device may choose to use the function specified in a park reminder message if the settings on device 70 have not been initialized so as to contain a valid specification. In certain embodiments more than one function can be specified and performed.

Examples of specific functions or alert types that can be performed include a visual indication such as, for example, the flashing of a symbol 555 on the remote device 70, as illustrated in FIG. 7A. As shown in FIG. 7A, a number may be adjacent to the flashing symbol to indicate the number of calls that have been parked. In addition, or alternatively, another embodiment of a visual indication is illustrated in FIG. 7B, in which a pop-up window 558 menu may be displayed. The window 558 includes a message containing the text "You Have 2 Parked Calls" and a software button 556. The button 556 allows the user to acknowledge "OK" the visual indication by pressing the button 556 by any available method supported by the device 70 (e.g., via the keypad, track ball, roller wheel, touch screen, etc.). After acknowledging the message, the device 70 may display the names of the parked individuals, as discussed above with respect to FIG. 5G. Other embodiments of the park reminder message may include a vibration of the remote device 70, an audible tone sent through the remote device 70, a text message displayed on the face of the remote device 70, or an email message displayed on the face of the remote device 70. These are merely examples, and are not intended to be limiting.

Figure 8:
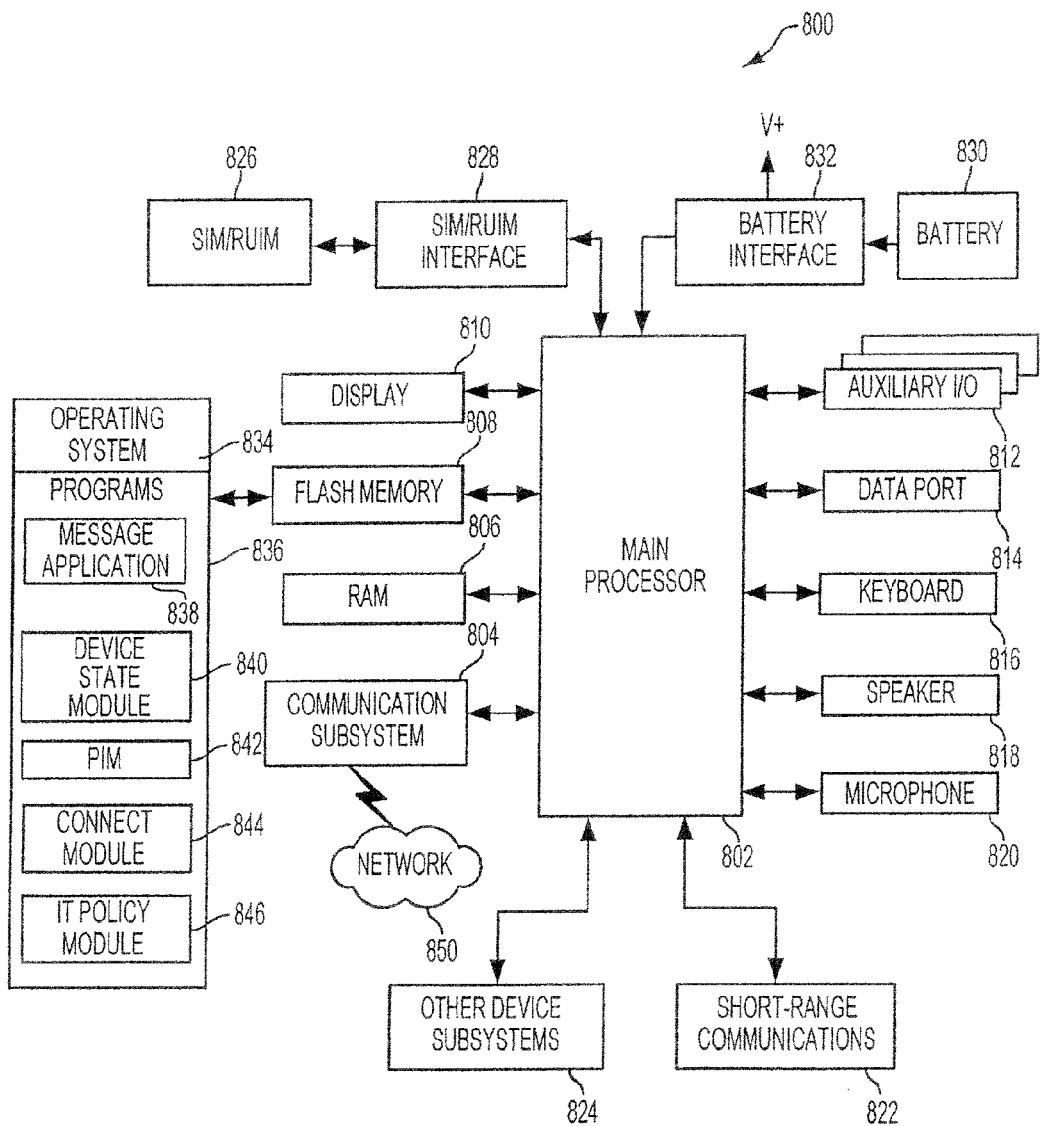
FIG. 8 is a block diagram of an example mobile device constructed in accordance with an embodiment disclosed herein.

In one embodiment, remote device 70 can be implemented as mobile device 800, illustrated in FIG. 8. Mobile device 800 is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device 800 and how it communicates with other devices and host systems, reference will now be made to FIGS. 8 through 11.

Referring to FIG. 8, shown therein is a block diagram of an exemplary embodiment of a mobile device 800. The mobile device 800 includes a number of components such as a main processor 802 that controls the overall operation of the mobile device 800. Communication functions, including data and voice communications, are performed through a communication subsystem 804. The communication subsystem 804 receives messages from and sends messages to a wireless network 850. In this exemplary embodiment of the mobile device 800, the communication subsystem 804 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 804 with the wireless network 850 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 850 associated with mobile device 800 is a GSM/GPRS wireless network in one exemplary implementation, other wireless networks may also be associated with the mobile device 800 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex.™ and DataTAC.™ network communication systems. Examples of other voice-centric data networks include Personal Communication Systems (PCS) networks like GSM and Time Division Multiple Access (TDMA) systems.

The main processor 802 also interacts with additional subsystems such as a Random Access Memory (RAM) 806, a flash memory 808, a display 810, an auxiliary input/output (I/O) subsystem 812, a data port 814, a keyboard 816, a speaker 818, a microphone 820, short-range communications 822 and other device subsystems 824.

Some of the subsystems of the mobile device 800 perform communication-related functions, whereas other subsystems may provide "resident" or on-device functions. By way of example, the display 810 and the keyboard 816 may be used for both communication-related functions, such as entering a text message for transmission over the network 850, and device-resident functions such as a calculator or task list.

The mobile device 800 can send and receive communication signals over the wireless network 850 after required network registration or activation procedures have been completed. Network access is associated with a subscriber or user of the mobile device 800. To identify a subscriber, the mobile device 800 requires a SIM/RUIM card 826 (i.e. Subscriber Identity Module or a Removable User Identity Module) to be inserted into a SIM/RUIM interface 828 in order to communicate with a network. The SIM card or RUIM 826 is one type of a conventional "smart card" that can be used to identify a subscriber of the mobile device 800 and to personalize the mobile device 800, among other things. Without the SIM card 826, the mobile device 800 is not fully operational for communication with the wireless network 850. By inserting the SIM card/RUIM 826 into the SIM/RUIM interface 828, a subscriber can access all subscribed services. Services may include: web browsing and messaging such as e-mail, voice-mail, Short Message Service (SMS), and Multimedia Messaging Services (MMS). More advanced services may include: point of sale, field service and sales force automation. The SIM card/RUIM 826 includes a processor and memory for storing information. Once the SIM card/RUIN 826 is inserted into the SIM/RUIM interface 828, it is coupled to the main processor 802. In order to identify the subscriber, the SIM card/RUIM 826 can include some user parameters such as an International Mobile Subscriber Identity (IMSI). An advantage of using the SIM card/RUIM 826 is that a subscriber is not necessarily bound by any single physical mobile device. The SIM card/RUIM 826 may store additional subscriber information for a mobile device as well, including datebook (or calendar) information and recent call information. Alternatively, user identification information can also be programmed into the flash memory 808.

The mobile device 800 is a battery-powered device and includes a battery interface 832 for receiving one or more rechargeable batteries 830. In at least some embodiments, the battery 830 can be a smart battery with an embedded microprocessor. The battery interface 832 is coupled to a regulator (not shown), which assists the battery 830 in providing power V+to the mobile device 800. Although current technology makes use of a battery, future technologies such as micro fuel cells may provide the power to the mobile device 800.

The mobile device 800 also includes an operating system 834 and software components 836 to 846 which are described in more detail below. The operating system 834 and the software components 836 to 846 that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 846, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the mobile device 800 during its manufacture. Other software applications include a message application 838 that can be any suitable software program that allows a user of the mobile device 800 to send and receive electronic messages. Various alternatives exist for the message application 838 as is well known to those skilled in the art. Messages that have been sent or received by the user are typically stored in the flash memory 808 of the mobile device 800 or some other suitable storage element in the mobile device 800. In at least some embodiments, some of the sent and received messages may be stored remotely from the device 800 such as in a data store of an associated host system that the mobile device 800 communicates with.

The software applications can further include a device state module 840, a Personal Information Manager (PIM) 842, and other suitable modules (not shown). The device state module 840 provides persistence, i.e. the device state module 840 ensures that important device data is stored in persistent memory, such as the flash memory 808, so that the data is not lost when the mobile device 800 is turned off or loses power.

The PIM 842 includes functionality for organizing and managing data items of interest to the user, such as, but not limited to, e-mail, contacts, calendar events, voicemails, appointments, and task items. A PIM application has the ability to send and receive data items via the wireless network 850. PIM data items may be seamlessly integrated, synchronized, and updated via the wireless network 850 with the mobile device subscriber's corresponding data items stored and/or associated with a host computer system. This functionality creates a mirrored host computer on the mobile device 800 with respect to such items. This can be particularly advantageous when the host computer system is the mobile device subscriber's office computer system.

The mobile device 800 also includes a connect module 844, and an IT policy module 846. The connect module 844 implements the communication protocols that are required for the mobile device 800 to communicate with the wireless infrastructure and any host system, such as an enterprise system, that the mobile device 800 is authorized to interface with. Examples of a wireless infrastructure and an enterprise system are given in FIGS. 10 and 11, which are described in more detail below.

The connect module 844 includes a set of APIs that can be integrated with the mobile device 800 to allow the mobile device 800 to use any number of services associated with the enterprise system. The connect module 844 allows the mobile device 800 to establish an end-to-end secure, authenticated communication pipe with the host system. A subset of applications for which access is provided by the connect module 844 can be used to pass IT policy commands from the host system to the mobile device 800. This can be done in a wireless or wired manner. These instructions can then be passed to the IT policy module 846 to modify the configuration of the device 800. Alternatively, in some cases, the IT policy update can also be done over a wired connection.

The IT policy module 846 receives IT policy data that encodes the IT policy. The IT policy module 846 then ensures that the IT policy data is authenticated by the mobile device 800. The IT policy data can then be stored in the flash memory 806 in its native form. After the IT policy data is stored, a global notification can be sent by the IT policy module 846 to all of the applications residing on the mobile device 800. Applications for which the IT policy may be applicable then respond by reading the IT policy data to look for IT policy rules that are applicable.

The IT policy module 846 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 846 can determine which applications are affected by the IT policy data and send a notification to only those applications. In either of these cases, for applications that aren't running at the time of the notification, the applications can call the parser or the IT policy module 846 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 846 sends an acknowledgement back to the host system to indicate that the IT policy data was received and successfully applied.

Other types of software applications can also be installed on the mobile device 800. These software applications can be third party applications, which are added after the manufacture of the mobile device 800. Examples of third party applications include games, calculators, utilities, etc.

The additional applications can be loaded onto the mobile device 800 through at least one of the wireless network 850, the auxiliary I/O subsystem 812, the data port 814, the short-range communications subsystem 822, or any other suitable device subsystem 824. This flexibility in application installation increases the functionality of the mobile device 800 and may provide enhanced on-device functions, communication-related functions, or both. For example, secure communication applications may enable electronic commerce functions and other such financial transactions to be performed using the mobile device 800.

The data port 814 enables a subscriber to set preferences through an external device or software application and extends the capabilities of the mobile device 800 by providing for information or software downloads to the mobile device 800 other than through a wireless communication network. The alternate download path may, for example, be used to load an encryption key onto the mobile device 800 through a direct and thus reliable and trusted connection to provide secure device communication.

The data port 814 can be any suitable port that enables data communication between the mobile device 800 and another computing device. The data port 814 can be a serial or a parallel port. In some instances, the data port 814 can be a USB port that includes data lines for data transfer and a supply line that can provide a charging current to charge the battery 830 of the mobile device 800.

The short-range communications subsystem 822 provides for communication between the mobile device 800 and different systems or devices, without the use of the wireless network 850. For example, the subsystem 822 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 804 and input to the main processor 802. The main processor 802 will then process the received signal for output to the display 810 or alternatively to the auxiliary I/O subsystem 812. A subscriber may also compose data items, such as e-mail messages, for example, using the keyboard 816 in conjunction with the display 810 and possibly the auxiliary I/O subsystem 812. The auxiliary subsystem 812 may include devices such as: a touch screen, mouse, track ball, infrared fingerprint detector, or a roller wheel with dynamic button pressing capability. The keyboard 816 is preferably an alphanumeric keyboard and/or telephone-type keypad. However, other types of keyboards may also be used. A composed item may be transmitted over the wireless network 850 through the communication subsystem 804.

For voice communications, the overall operation of the mobile device 800 is substantially similar, except that the received signals are output to the speaker 818, and signals for transmission are generated by the microphone 820. Alternative voice or audio I/O subsystems, such as a voice message recording subsystem, can also be implemented on the mobile device 800. Although voice or audio signal output is accomplished primarily through the speaker 818, the display 810 can also be used to provide additional information such as the identity of a calling party, duration of a voice call, or other voice call related information.

Figure 9:
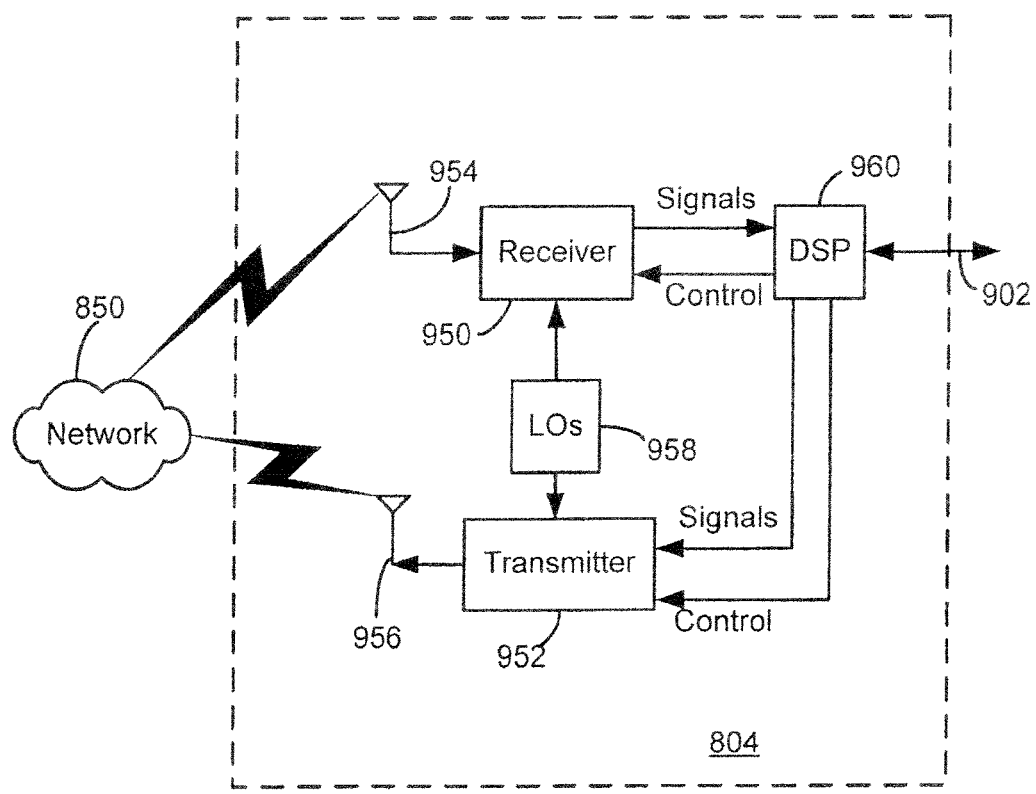
FIG. 9 is a block diagram of an example communication subsystem component of the mobile device in accordance with an embodiment disclosed herein.

Referring to FIG. 9, an exemplary block diagram of the communication subsystem component 804 is shown. The communication subsystem 804 includes a receiver 950, a transmitter 952, as well as associated components such as one or more embedded or internal antenna elements 954 and 956, Local Oscillators (LOs) 958, and a processing module such as a Digital Signal Processor (DSP) 960. The particular design of the communication subsystem 804 is dependent upon the communication network 850 with which the mobile device 800 is intended to operate. Thus, it should be understood that the design illustrated in FIG. 9 serves only as one example.

Signals received by the antenna 954 through the wireless network 850 are input to the receiver 950, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 960. In a similar manner, signals to be transmitted are processed, including modulation and encoding, by the DSP 960. These DSP-processed signals are input to the transmitter 952 for digital-to-analog (D/A) conversion, frequency up conversion, filtering, amplification and transmission over the wireless network 850 via the antenna 956. The DSP 960 not only processes communication signals, but also provides for receiver and transmitter control. For example, the gains applied to communication signals in the receiver 950 and the transmitter 952 may be adaptively controlled through automatic gain control algorithms implemented in the DSP 960.

The wireless link between the mobile device 800 and the wireless network 850 can contain one or more different channels, typically different RF channels, and associated protocols used between the mobile device 800 and the wireless network 850. An RF channel is a limited resource that must be conserved, typically due to limits in overall bandwidth and limited battery power of the mobile device 800.

When the mobile device 800 is fully operational, the transmitter 952 is typically keyed or turned on only when it is transmitting to the wireless network 850 and is otherwise turned off to conserve resources. Similarly, the receiver 950 is periodically turned off to conserve power until it is needed to receive signals or information (if at all) during designated time periods.

Figure 10:
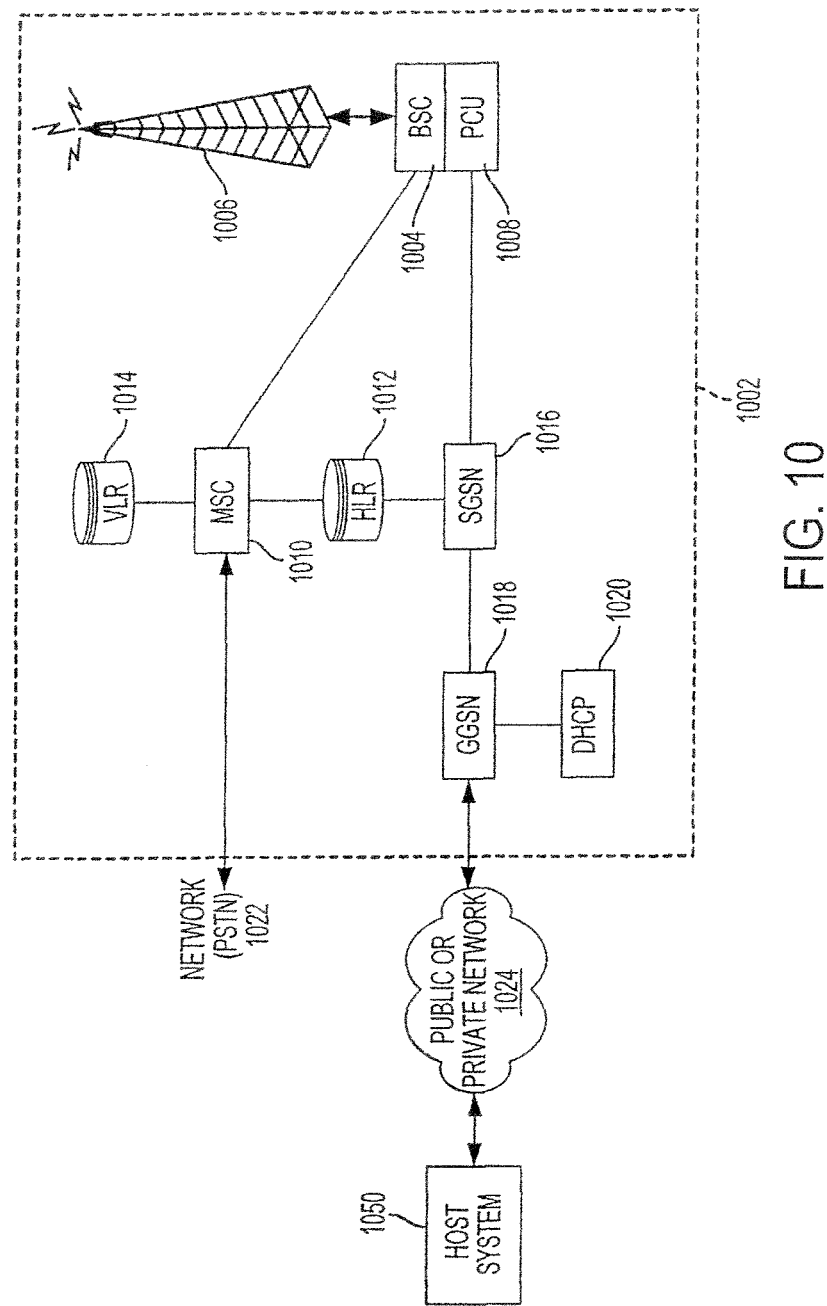
FIG. 10 is a block diagram of an example node of a wireless network in accordance with an embodiment disclosed herein.

Referring to FIG. 10, a block diagram of an exemplary implementation of a node 1002 of the wireless network 850 is shown. In practice, the wireless network 850 comprises one or more nodes 1002. In conjunction with the connect module 844, the mobile device 800 can communicate with the node 1002 within the wireless network 850. In the exemplary implementation of FIG. 10, the node 1002 is configured in accordance with General Packet Radio Service (GPRS) and Global Systems for Mobile (GSM) technologies. The node 1002 includes a base station controller (BSC) 1004 with an associated tower station 1006, a Packet Control Unit (PCU) 1008 added for GPRS support in GSM, a Mobile Switching Center (MSC) 1010, a Home Location Register (HLR) 1012, a Visitor Location Registry (VLR) 1014, a Serving GPRS Support Node (SGSN) 1016, a Gateway GPRS Support Node (GGSN) 1018, and a Dynamic Host Configuration Protocol (DHCP) 1020. This list of components is not meant to be an exhaustive list of the components of every node 1002 within a GSM/GPRS network, but rather a list of components that are commonly used in communications through the network 850.

In a GSM network, the MSC 1010 is coupled to the BSC 1004 and to a landline network, such as a Public Switched Telephone Network (PSTN) 1022 to satisfy circuit switched requirements. The connection through the PCU 1008, the SGSN 1016 and the GGSN 1018 to a public or private network (Internet) 1024 (also referred to herein generally as a shared network infrastructure) represents the data path for GPRS capable mobile devices. In a GSM network extended with GPRS capabilities, the BSC 1004 also contains the Packet Control Unit (PCU) 1008 that connects to the SGSN 1016 to control segmentation, radio channel allocation and to satisfy packet switched requirements. To track the location of the mobile device 800 and availability for both circuit switched and packet switched management, the HLR 1012 is shared between the MSC 1010 and the SGSN 1016. Access to the VLR 1014 is controlled by the MSC 1010.

The station 1006 is a fixed transceiver station and together with the BSC 1004 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 1006. The fixed transceiver equipment normally performs such functions as modulation and possibly encoding and/or encryption of signals to be transmitted to the mobile device 800 in accordance with particular, usually predetermined, communication protocols and parameters, under control of its controller. The fixed transceiver equipment similarly demodulates and possibly decodes and decrypts, if necessary, any communication signals received from the mobile device 800 within its cell. Communication protocols and parameters may vary between different nodes. For example, one node may employ a different modulation scheme and operate at different frequencies than other nodes.

For all mobile devices 800 registered with a specific network, permanent configuration data such as a user profile is stored in the HLR 1012. The HLR 1012 also contains location information for each registered mobile device and can be queried to determine the current location of a mobile device. The MSC 1010 is responsible for a group of location areas and stores the data of the mobile devices currently in its area of responsibility in the VLR 1014. Further, the VLR 1014 also contains information on mobile devices that are visiting other networks. The information in the VLR 1014 includes part of the permanent mobile device data transmitted from the HLR 1012 to the VLR 1014 for faster access. By moving additional information from a remote HLR 1012 node to the VLR 1014, the amount of traffic between these nodes can be reduced so that voice and data services can be provided with faster response times and at the same time requiring less use of computing resources.

The SGSN 1016 and the GGSN 1018 are elements added for GPRS support; namely packet switched data support, within GSM. The SGSN 1016 and the MSC 1010 have similar responsibilities within the wireless network 850 by keeping track of the location of each mobile device 800. The SGSN 1016 also performs security functions and access control for data traffic on the wireless network 800. The GGSN 1018 provides internetworking connections with external packet switched networks and connects to one or more SGSN's 1016 via an Internet Protocol (IP) backbone network operated within the network 850. During normal operations, a given mobile device 800 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 1020 connected to the GGSN 1018. There are many mechanisms for dynamic IP assignment, including using a combination of a Remote Authentication Dial-In User Service (RADIUS) server and a DHCP server. Once the GPRS Attach is complete, a logical connection is established from a mobile device 800, through the PCU 1008, and the SGSN 1016 to an Access Point Node (APN) within the GGSN 1018. The APN represents a logical end of an IP tunnel that can either access direct Internet compatible services or private network connections. The APN also represents a security mechanism for the network 850, insofar as each mobile device 800 must be assigned to one or more APNs and mobile devices 800 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 850. To maximize use of the PDP Contexts, the network 800 will run an idle timer for each PDP Context to determine if there is a lack of activity. When a mobile device 800 is not using its PDP Context, the PDP Context can be de-allocated and the IP address returned to the IP address pool managed by the DHCP server 1020.

Referring to FIG. 1, shown therein is a block diagram illustrating components of an exemplary configuration of a host system 480 that the mobile device 800 can communicate with in conjunction with the connect module 844. The host system 480 will typically be a corporate enterprise or other local area network (LAN), but may also be a home office computer or some other private system, for example, in variant implementations. In this example shown in FIG. 11, the host system 480 is depicted as a LAN of an organization to which a user of the mobile device 800 belongs. Typically, a plurality of mobile devices can communicate wirelessly with the host system 480 through one or more nodes 1002 of the wireless network 850.

The host system 480 comprises a number of network components connected to each other by a network 1160. For instance, a user's desktop computer 1162*a* with an accompanying cradle 1164 for the user's mobile device 800 is situated on a LAN connection. The cradle 1164 for the mobile device 800 can be coupled to the computer 1162*a* by a serial or a Universal Serial Bus (USB) connection, for example. Other user computers 1162*b*-1162*n* are also situated on the network 1160, and each may or may not be equipped with an accompanying cradle 1164. The cradle 1164 facilitates the loading of information (e.g. PIM data, private symmetric encryption keys to facilitate secure communications) from the user computer 1162a to the mobile device 800, and may be particularly useful for bulk information updates often performed in initializing the mobile device 800 for use. The information downloaded to the mobile device 800 may include certificates used in the exchange of messages.

Figure 11:
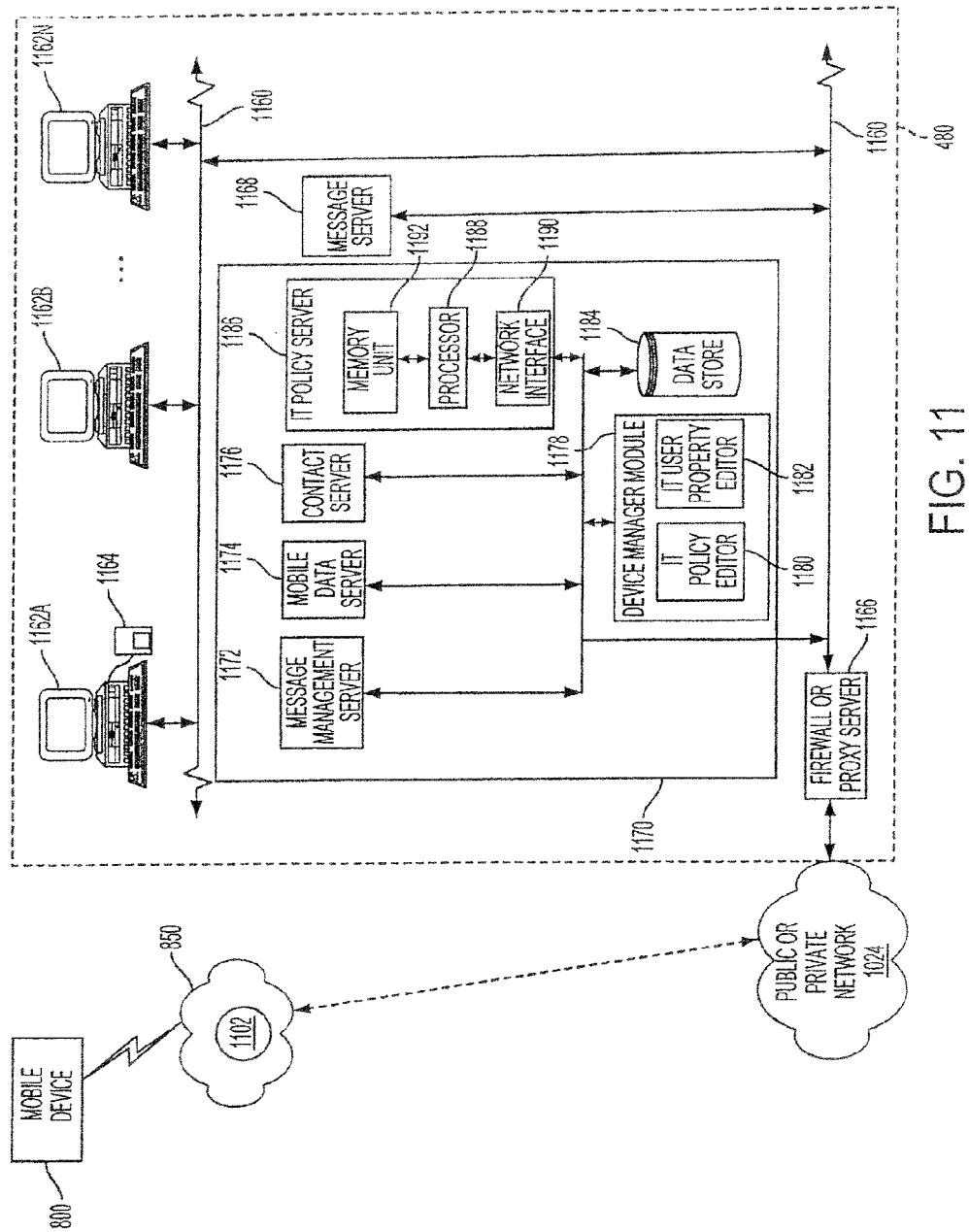
FIG. 11 is a block diagram illustrating components of a host system in one exemplary configuration for use with the wireless network of FIG. 10 and the mobile device of FIG. 8.

It will be understood by persons skilled in the art that the user computers 1162a-1162n will typically also be connected to other peripheral devices, such as printers, etc. which are not explicitly shown in FIG. 11. Furthermore, only a subset of network components of the host system 480 are shown in FIG. 11 for ease of exposition, and it will be understood by persons skilled in the art that the host system 480 will comprise additional components that are not explicitly shown in FIG. 11 for this exemplary configuration. More generally, the host system 480 may represent a smaller part of a larger network (not shown) of the organization, and may comprise different components and/or be arranged in different topologies than that shown in the exemplary embodiment of FIG. 11.

To facilitate the operation of the mobile device 800 and the wireless communication of messages and message-related data between the mobile device 800 and components of the host system 480, a number of wireless communication support components 1170 can be provided. In some implementations, the wireless communication support components 1170 can include a message management server 1172, a mobile data server 1174, a contact server 1176, and a device manager module 1178. The device manager module 1178 includes an IT Policy editor 1180 and an IT user property editor 1182, as well as other software components for allowing an IT administrator to configure the mobile devices 800. In an alternative embodiment, there may be one editor that provides the functionality of both the IT policy editor 1180 and the IT user property editor 1182. The support components 1170 also include a data store 1184, and an IT policy server 1186. The IT policy server 286 includes a processor 1188, a network interface 1190 and a memory unit 1192. The processor 1188 controls the operation of the IT policy server 1186 and executes functions related to the standardized IT policy as described below. The network interface 1190 allows the IT policy server 1186 to communicate with the various components of the host system 480 and the mobile devices 800. The memory unit 1192 can store functions used in implementing the IT policy as well as related data. Those skilled in the art know how to implement these various components. Other components may also be included as is well known to those skilled in the art. Further, in some implementations, the data store 1184 can be part of any one of the servers.

In this exemplary embodiment, the mobile device 800 communicates with the host system 480 through node 1002 of the wireless network 850 and a shared network infrastructure 1124 such as a service provider network or the public Internet. Access to the host system 480 may be provided through one or more routers (not shown), and computing devices of the host system 480 may operate from behind a firewall or proxy server 1166. The proxy server 1166 provides a secure node and a wireless internet gateway for the host system 480. The proxy server 1166 intelligently routes data to the correct destination server within the host system 480.

In some implementations, the host system 480 can include a wireless VPN router (not shown) to facilitate data exchange between the host system 480 and the mobile device 800. The wireless VPN router allows a VPN connection to be established directly through a specific wireless network to the mobile device 800. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 800 in this alternative implementation.

Messages intended for a user of the mobile device 800 are initially received by a message server 1168 of the host system 480. Such messages may originate from any number of sources. For instance, a message may have been sent by a sender from the computer 1162b within the host system 480, from a different mobile device (not shown) connected to the wireless network 850 or a different wireless network, or from a different computing device, or other device capable of sending messages, via the shared network infrastructure 1124, possibly through an application service provider (ASP) or Internet service provider (ISP), for example.

The message server 1168 typically acts as the primary interface for the exchange of messages, particularly e-mail messages, within the organization and over the shared network infrastructure 1124. Each user in the organization that has been set up to send and receive messages is typically associated with a user account managed by the message server 1168. Some exemplary implementations of the message server 1168 include a Microsoft Exchange™ server, a Lotus Domino™ server, a Novell Groupwise™ server, or another suitable mail server installed in a corporate environment. In some implementations, the host system 480 may comprise multiple message servers 1168. The message server 1168 may also be adapted to provide additional functions beyond message management, including the management of data associated with calendars and task lists, for example.

When messages are received by the message server 1168, they are typically stored in a data store associated with the message server 1168. In at least some embodiments, the data store may be a separate hardware unit, such as data store 1184, that the message server 1168 communicates with. Messages can be subsequently retrieved and delivered to users by accessing the message server 1168. For instance, an e-mail client application operating on a user's computer 1162a may request the e-mail messages associated with that user's account stored on the data store associated with the message server 1168. These messages are then retrieved from the data store and stored locally on the computer 1162a. The data store associated with the message server 1168 can store copies of each message that is locally stored on the mobile device 800. Alternatively, the data store associated with the message server 1168 can store all of the messages for the user of the mobile device 800 and only a smaller number of messages can be stored on the mobile device 800 to conserve memory. For instance, the most recent messages (i.e., those received in the past two to three months for example) can be stored on the mobile device 800.

When operating the mobile device 800, the user may wish to have e-mail messages retrieved for delivery to the mobile device 800. The message application 838 operating on the mobile device 800 may also request messages associated with the user's account from the message server 1168. The message application 838 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 800 is assigned its own e-mail address, and messages addressed specifically to the mobile device 800 are automatically redirected to the mobile device 800 as they are received by the message server 1168.

The message management server 1172 can be used to specifically provide support for the management of messages, such as e-mail messages, that are to be handled by mobile devices. Generally, while messages are still stored on the message server 1168, the message management server 1172 can be used to control when, if, and how messages are sent to the mobile device 800. The message management server 1172 also facilitates the handling of messages composed on the mobile device 800, which are sent to the message server 1168 for subsequent delivery.

For example, the message management server 1172 may monitor the user's "mailbox" (e.g. the message store associated with the user's account on the message server 1168) for new e-mail messages, and apply user-definable filters to new messages to determine if and how the messages are relayed to the user's mobile device 800. The message management server 1172 may also compress and encrypt new messages (e.g. using an encryption technique such as Data Encryption Standard (DES), Triple DES, or Advanced Encryption Standard (AES)) and push them to the mobile device 800 via the shared network infrastructure 1124 and the wireless network 850. The message management server 1172 may also receive messages composed on the mobile device 800 (e.g. encrypted using Triple DES), decrypt and decompress the composed messages, re-format the composed messages if desired so that they will appear to have originated from the user's computer 1162a, and re-route the composed messages to the message server 1168 for delivery.

Certain properties or restrictions associated with messages that are to be sent from and/or received by the mobile device 800 can be defined (e.g. by an administrator in accordance with IT policy) and enforced by the message management server 1172. These may include whether the mobile device 800 may receive encrypted and/or signed messages, minimum encryption key sizes, whether outgoing messages must be encrypted and/or signed, and whether copies of all secure messages sent from the mobile device 800 are to be sent to a pre-defined copy address, for example.

The message management server 1172 may also be adapted to provide other control functions, such as only pushing certain message information or pre-defined portions (e.g. "blocks") of a message stored on the message server 1168 to the mobile device 800. For example, in some cases, when a message is initially retrieved by the mobile device 800 from the message server 1168, the message management server 1172 may push only the first part of a message to the mobile device 800, with the part being of a pre-defined size (e.g. 2 KB). The user can then request that more of the message be delivered in similar-sized blocks by the message management server 1172 to the mobile device 800, possibly up to a maximum predefined message size. Accordingly, the message management server 1172 facilitates better control over the type of data and the amount of data that is communicated to the mobile device 800, and can help to minimize potential waste of bandwidth or other resources.

The mobile data server 1174 encompasses any other server that stores information that is relevant to the corporation. The mobile data server 1174 may include, but is not limited to, databases, online data document repositories, customer relationship management (CRM) systems, or enterprise resource planning (ERP) applications.

The contact server 1176 can provide information for a list of contacts for the user in a similar fashion as the address book on the mobile device 800. Accordingly, for a given contact, the contact server 1176 can include the name, phone number, work address and e-mail address of the contact, among other information. The contact server 1176 can also provide a global address list that contains the contact information for all of the contacts associated with the host system 480.

It will be understood by persons skilled in the art that the message management server 1172, the mobile data server 1174, the contact server 1176, the device manager module 1178, the data store 1184 and the IT policy server 1186 do not need to be implemented on separate physical servers within the host system 480. For example, some or all of the functions associated with the message management server 1172 may be integrated with the message server 1168, or some other server in the host system 480. Alternatively, the host system 840 may comprise multiple message management servers 1172, particularly in variant implementations where a large number of mobile devices need to be supported.

Alternatively, in some embodiments, the IT policy server 1186 can provide the IT policy editor 1180, the IT user property editor 1182 and the data store 1184. In some cases, the IT policy server 1186 can also provide the device manager module 1178. The processor 1188 can execute the editors 1180 and 1182. In some cases, the functionality of the editors 1180 and 1182 can be provided by a single editor. In some cases, the memory unit 1192 can provide the data store 1184.

The device manager module 1178 provides an IT administrator with a graphical user interface with which the IT administrator interacts to configure various settings for the mobile devices 800. As mentioned, the IT administrator can use IT policy rules to define behaviors of certain applications on the mobile device 800 that are permitted such as phone, web browser or Instant Messenger use. The IT policy rules can also be used to set specific values for configuration settings that an organization requires on the mobile devices 800 such as auto signature text, WLAN/VoIP/VPN configuration, security requirements (e.g. encryption algorithms, password rules, etc.), specifying themes or applications that are allowed to run on the mobile device 800, and the like.

While preferred embodiments have been specifically described and illustrated herein, it should be apparent that many modifications to the embodiments can be made. For example, while the preferred embodiments illustrated herein have been limited to the processing of voice (packet or circuit switched) calls, it should be readily apparent that any form of call (e.g., audio, video, data) may be processed through server 30 to any communication device (e.g., cellular phone, pager, office/residential landline telephone, computer terminal, personal digital assistant (PDA), RIM device, etc.). The individual method steps of the exemplary operational flows illustrated in FIGS. 6A-6G may be interchanged in order, combined, replaced or even added. Any number of different operations not illustrated herein may be performed. Moreover, the method steps may be performed by hardware, software, firmware or any combinations of hardware, software, firmware or logic elements.

In addition, while the illustrated embodiments have demonstrated implementations using PBX-based communication systems, it should be readily apparent that the server module may be connected (directly, indirectly, co-located, or remotely) with any other network switching device or communication system used to process calls such as a central switching office, centrex system, or Internet server for telephone calls made over the public switched telephone network, private telephone networks, or even Internet Protocol (IP) telephony networks made over the Internet. It should be understood by those skilled in the art that the embodiments disclosed do not need a PBX to operate or to perform any of the processing described above. All that is required is a properly programmed server 30.

It should be apparent that, while only PRI lines (e.g., between PBX 14 and server 30, between PBX 14 and PSTN 16) have been illustrated in discussing the preferred embodiments, these communication lines (as well as any other communication lines or media discussed herein) may be of any form, format, or medium (e.g., PRI, T1, OC3, electrical, optical, wired, wireless, digital, analog, etc.). Moreover, although PSTN 16, 54 are depicted as separate networks for illustration purposes, it should be readily apparent that a single PSTN network alone may be used in practice. It should be noted that the server 30 could trunk back to the PBX 14 instead of being directly connected to the PSTN 54. The use of a commercial wireless carrier network (represented by wireless switch 58 and antenna 60) as described herein may be implemented using one or more commercial carriers using the same or different signaling protocols (e.g., Sprint/Nextel, etc.) depending on the communication devices registered with the system.

The modules described herein such as the modules making up server 30, as well as server 30 and PBX 14 themselves, may be one or more hardware, software, or hybrid components residing in (or distributed among) one or more local or remote systems. It should be readily apparent that the modules may be combined (e.g., server 30 and PBX 14) or further separated into a variety of different components, sharing different resources (including processing units, memory, clock devices, software routines, etc.) as required for the particular implementation of the embodiments disclosed herein. Indeed, even a single general purpose computer executing a computer program stored on a recording medium to produce the functionality and any other memory devices referred to herein may be utilized to implement the illustrated embodiments. User interface devices utilized by in or in conjunction with server 30 may be any device used to input and/or output information. The interface devices may be implemented as a graphical user interface (GUI) containing a display or the like, or may be a link to other user input/output devices known in the art.

Furthermore, memory units employed by the system may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a CPU, or shared with one or more of the other components.

What is claimed is:

1. A method of operating a communication server operable to maintain communication between at least two devices, the method comprising:
   receiving an incoming call for a first communication device at the communication server;
   routing the incoming call for the first communication device to a second communication device associated with the first communication device;
   receiving a park data signal from the second communication device for placing a call to park;
   parking the call to park; and
   sending a park reminder message to the first communication device.

2. The method of claim 1, wherein sending a park reminder message comprises sending the park reminder message with an indication of a length of time the call has been parked.

3. The method of claim 1, further comprising receiving a park reminder message response from the first communication device in response to receiving the park reminder message.

4. The method of claim 3, wherein receiving the park reminder message response comprises receiving the response with a request for terminating the sending of the park reminder message.

5. The method according to claim 1, wherein the park reminder message causes an alert on the communication device.

6. The method according to claim 5, wherein the alert comprises an audible tone.

7. The method according to claim 5, wherein the alert comprises a vibrational alert.

8. The method according to claim 5, wherein the alert comprises a pop-up menu.

9. The method according to claim 5, wherein the alert comprises a displayed symbol.

10. The method according to claim 1, wherein the sending a park reminder message occurs a predetermined length of time after receiving the park data signal.

11. The method according to claim 10, wherein the park data signal includes an indication of the predetermined length of time.

12. The method according to claim 10, wherein the park reminder message response includes an indication of the predetermined length of time.

13. The method according to claim 10, further comprising repeating the sending step periodically, after the predetermined length of time.

14. The method according to claim 5, further comprising determining the alert type on the basis of settings maintained at the communication device.

15. The method according to claim 1, further comprising determining an alert type on the basis of settings accompanying the park reminder message response.

16. The method according to claim 4, further comprising terminating a sending of park reminder messages in response to the request for terminating the sending of park reminder messages.

17. The method according to claim 1, wherein the call placed to park is the incoming call.

18. A telecommunication server comprising:
   a processor configured to:
      receive an incoming call for a first communication device at the telecommunication server;
      route the incoming call for the first communication device to a second communication device associated with the first communication device;
      receive a park data signal from the second communication device for placing a call to park;
      park the call to park; and
      send a park reminder message to the first communication device.

* * * * *